(12) United States Patent  
Kim et al.

(10) Patent No.: US 11,803,630 B2  
(45) Date of Patent: Oct. 31, 2023

(54) METHOD AND APPARATUS FOR PROVIDING CAPTCHA SYSTEM

(71) Applicant: NEXON KOREA CORPORATION, Seongnam-si (KR)

(72) Inventors: Ki On Kim, Seongnam-si (KR); Myung Jin Park, Seongnam-si (KR)

(73) Assignee: NEXON KOREA CORPORATION, Seongnam-si (KR)

( * ) Notice: Subject to any disclaimer, the term of this patent is extended or adjusted under 35 U.S.C. 154(b) by 147 days.

(21) Appl. No.: 17/501,448

(22) Filed: Oct. 14, 2021

(65) Prior Publication Data

US 2022/0147609 A1 May 12, 2022

(30) Foreign Application Priority Data

Nov. 11, 2020 (KR) .................. 10-2020-0150524  
May 28, 2021 (KR) .................. 10-2021-0069534

(51) Int. Cl.
*G06F 21/36* (2013.01)
*G06T 13/80* (2011.01)

(52) U.S. Cl.
CPC .............. *G06F 21/36* (2013.01); *G06T 13/80* (2013.01); *G06F 2221/2133* (2013.01)

(58) Field of Classification Search
CPC ............ G06F 21/36; G06F 2221/2133; G06F 3/04845; G06F 3/04883; G06F 3/0489; G06T 13/80
USPC .......................................................... 726/3
See application file for complete search history.

(56) References Cited

U.S. PATENT DOCUMENTS

| | | | |
|---|---|---|---|
| 8,352,598 B2 | 1/2013 | Nyang et al. | |
| 2012/0195517 A1* | 8/2012 | Mittur | G06F 21/31 382/254 |
| 2017/0316191 A1 | 11/2017 | Sipos et al. | |

FOREIGN PATENT DOCUMENTS

| | | | |
|---|---|---|---|
| CN | 107463830 A | * | 12/2017 |
| KR | 20090054872 A | | 6/2009 |
| KR | 20110098453 A | | 9/2011 |

OTHER PUBLICATIONS

Request for the Submission of an Opinion for KR Appln. No. 2021-0069534 dated Jan. 16, 2023, all pages.

(Continued)

*Primary Examiner* — Jacob Lipman  
(74) *Attorney, Agent, or Firm* — KILPATRICK TOWNSEND & STOCKTON LLP

(57) ABSTRACT

The disclosure introduces a user authentication method Completely Automated Public Turing test to tell Computers and Humans Apart (CAPTCHA), the user authentication method including: determining a correct answer pattern having at least one correct answer direction; generating, with respect to each of the at least one correct answer direction, an animation of an arrow object rotating with a movement distinguished from movements in other directions with reference to the correct answer direction; displaying a CAPTCHA interface corresponding to the correct answer pattern and including an arrangement of the generated animation; receiving a direction input from a user; and determining whether the user has been authenticated according to a result of comparing the direction input with the correct answer pattern.

20 Claims, 19 Drawing Sheets

(56) References Cited

OTHER PUBLICATIONS

Stammy@macaw.social, What is this new dropbox captcha, (Aug 29, 2019), 1 page. Access at https://twitter.com/Stammy/status/1166757783594852356.

Gossweiler et al., "What's Up CAPTCHA? A CAPTCHA Based On Image Orientation," *WWW 2009,* Apr. 20-24, 2009, Madrid Spain. ACM 978-1-60558-487—Apr. 9, 2004.

Office Action for Korean Application No. 10-2021-0069534 dated Jul. 27, 2023, all pages.

\* cited by examiner

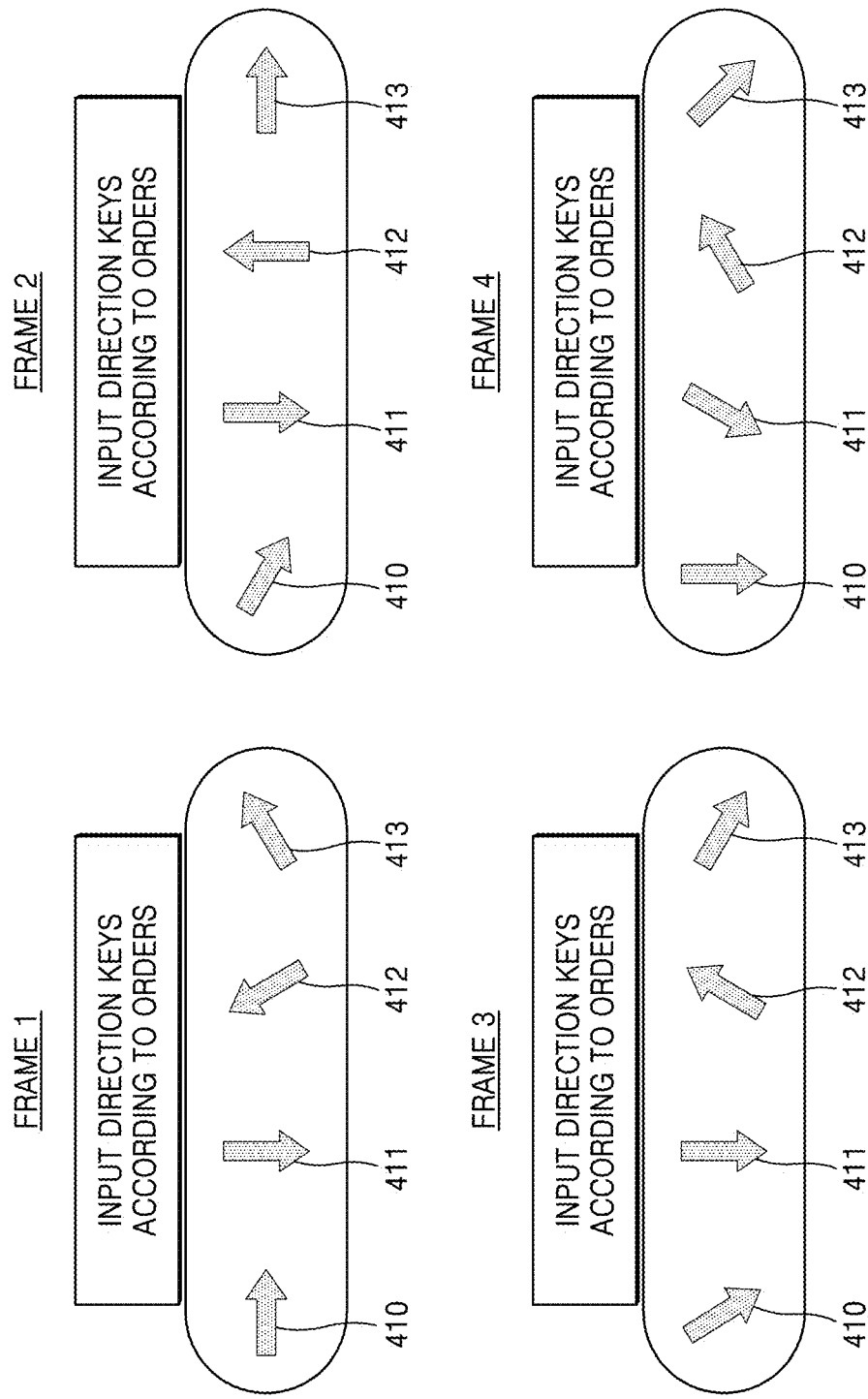

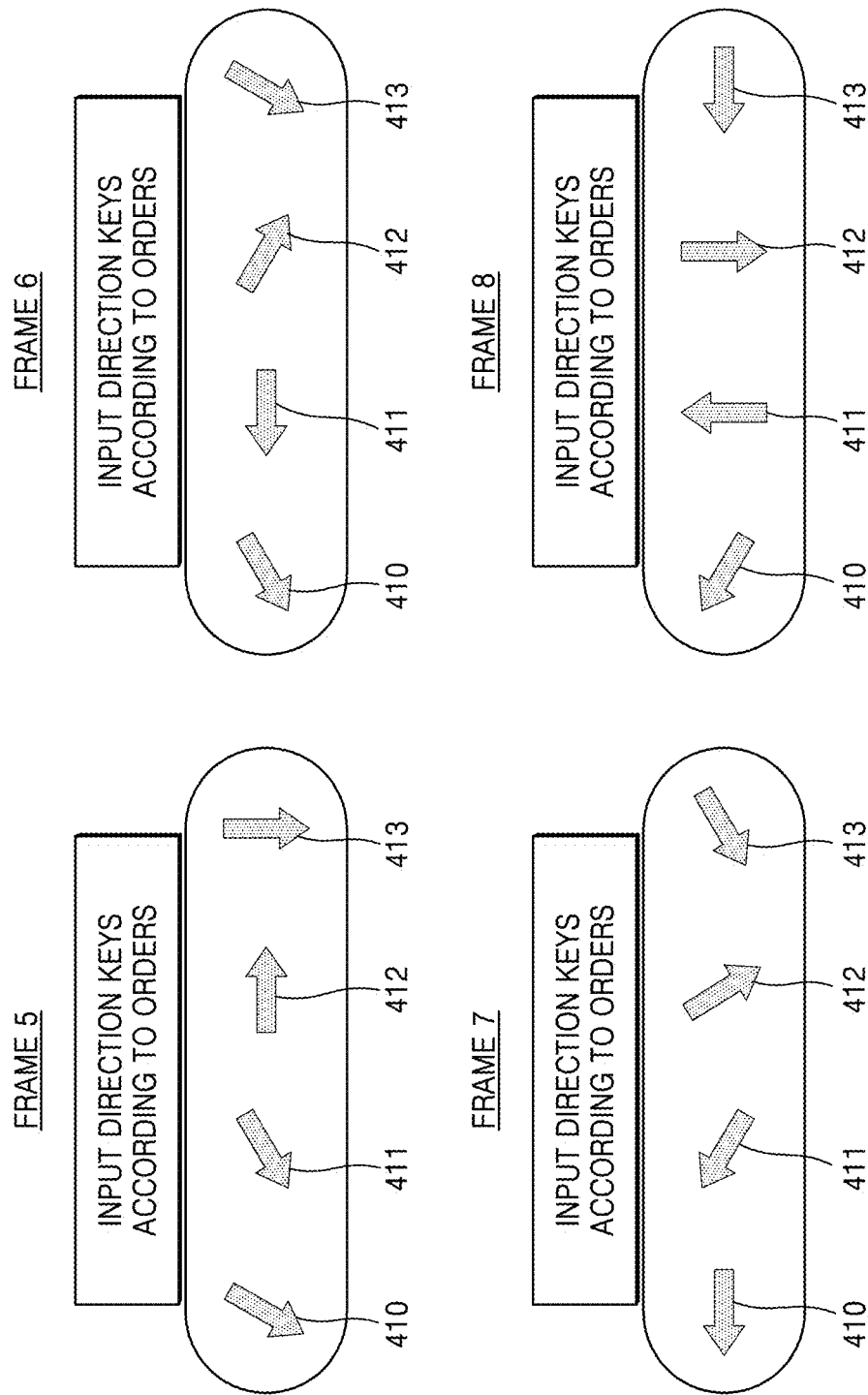

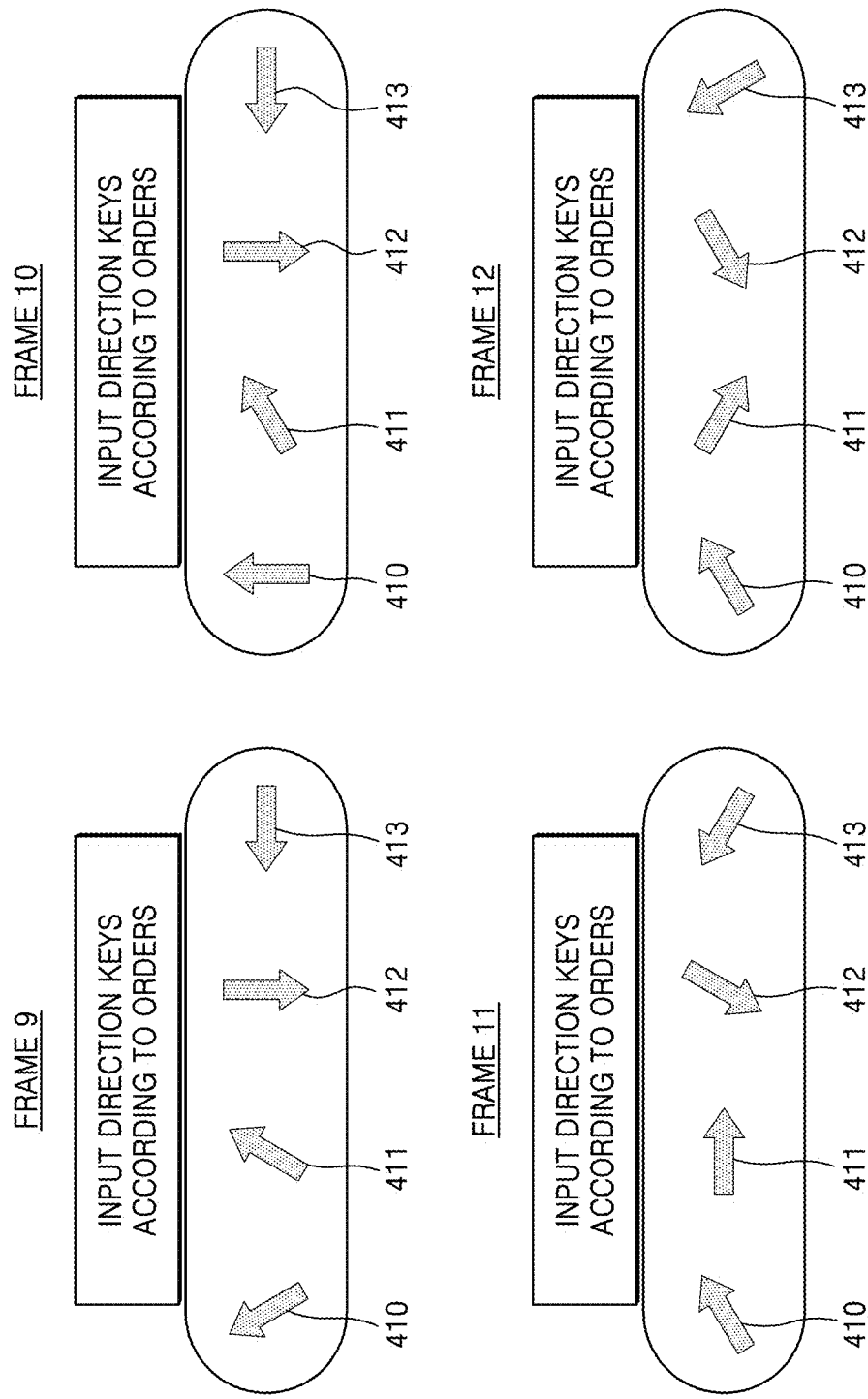

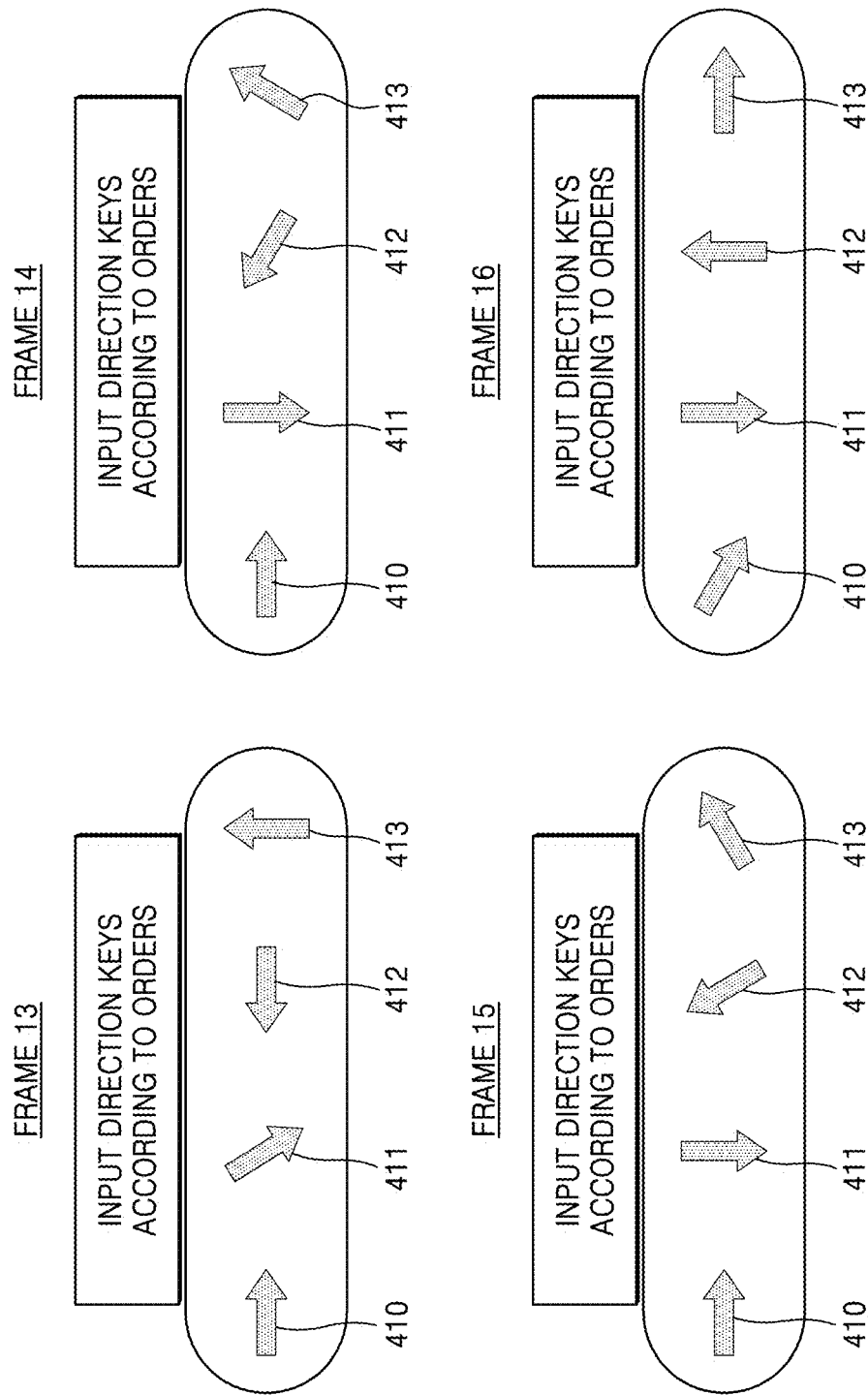

FIG. 8
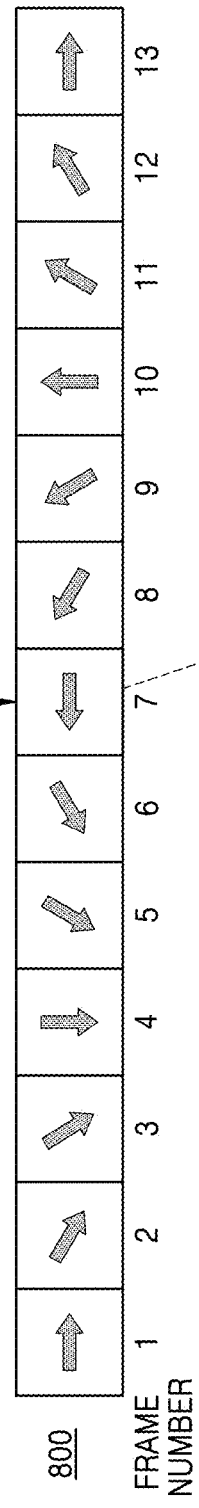
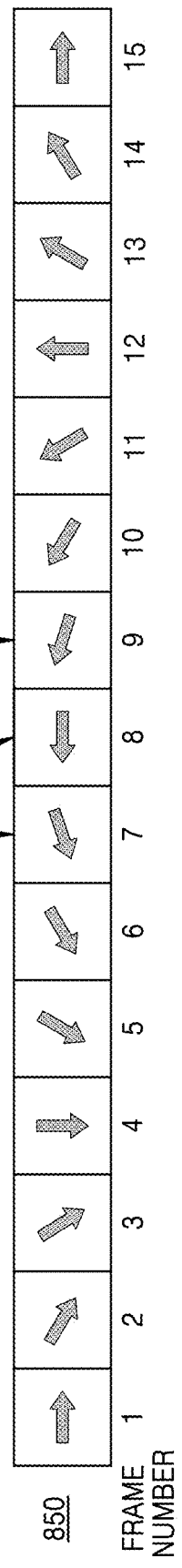

METHOD AND APPARATUS FOR PROVIDING CAPTCHA SYSTEM

CROSS-REFERENCE TO RELATED APPLICATIONS

This application is based on and claims priority under 35 U.S.C. § 119 to Korean Patent Applications No. 10-2020-0150524, filed on Nov. 11, 2020, and No. 10-2021-0069534, filed on May 28, 2021, in the Korean Intellectual Property Office, the disclosures of which are incorporated by reference herein in their entirety.

BACKGROUND

1. Field

The disclosure relates to a method and apparatus for providing a Completely Automated Public Turing test to tell Computers and Humans Apart (CAPTCHA) system. More particularly, the disclosure relates to a method and apparatus for generating an animation-based direction input CAPTCHA and authenticating users based thereon.

2. Description of the Related Art

CAPTCHA, which is a question-answering test automatically managed by a computer, is a test for distinguishing whether a user is a human or a machine. CAPTCHA is used with respect to information or services to limit the use of an automation program such as bot and permit access to an online service only to human users. For example, a game service provider which provides an online game may require user authentication by a CAPTCHA system while a user plays the game to detect and restrict abnormal users who use programs that automatically execute game contents without user inputs. As another example, CAPTCHA may be used for preventing spam on online bulletins or web mails, automatic member signing up, online vote manipulation, and the like.

The CAPTCHA system includes a device or a process of automatically generating questions that may be easily answered by humans but not easily answered by computers and requesting answers. Answerers who input correct answers to the questions are considered as humans. On the other hand, answerers who fail to input correct answers to the questions are considered as machines. Frequently used CAPTCHA systems include, for example, a system outputting an image that includes a character string on a screen and requesting input of the character string included in the image. A character string included in an image may be distorted to be difficult for machines to recognize it, whereas it may relatively easier for humans to recognize it.

However, in accordance with the recent development of computing devices and image recognition technology, more and more automation programs tend to avoid use of image-based CAPTCHA. For example, an automation program that attempts to avoid use of CAPTCHA may include a process of analyzing an image provided by the CAPTCHA system to remove distortion, and detecting a character string from the image removed of distortion and automatically inputting the character string.

Therefore, to protect information and services from such automation programs, further improved methods to distinguish humans from machines are required.

SUMMARY

The disclosure provides a method and an apparatus for generating an animation-based direction input CAPTCHA and authenticating users based thereon.

Additional aspects will be set forth in part in the description which follows and, in part, will be apparent from the description, or may be learned by practice of the presented embodiments of the disclosure.

According to various embodiments of the disclosure, there is provided a user authentication method Completely Automated Public Turing test to tell Computers and Humans Apart (CAPTCHA), the user authentication method including: determining a correct answer pattern having at least one correct answer direction; generating, with respect to each of the at least one correct answer direction, an animation of an arrow object rotating with a movement distinguished from movements in other directions with reference to the correct answer direction; displaying a CAPTCHA interface corresponding to the correct answer pattern and including an arrangement of the generated animation; receiving a direction input from the user; and determining whether the user has been authenticated according to a result of comparing the received direction input with the correct answer pattern.

According to an embodiment, each of the at least one correct answer direction may be determined as one of up, down, left, and right directions.

According to an embodiment, each of the at least one correct answer direction may be determined as an arbitrary direction.

According to an embodiment, the correct answer pattern may have a preset number of correct answer directions, and the CAPTCHA interface may include the preset number of animations of arrow objects.

According to an embodiment, the generating of the animation may include generating frames that construct an animation in which the arrow object rotates at a constant speed; and generating an animation in which the arrow object flickers when pointing in the correct answer direction, by removing the arrow object from a frame at a time point at which the arrow object points in the correct answer direction.

According to an embodiment, the generating of the animation may include generating frames that construct an animation in which the arrow object rotates at a constant speed; and generating an animation in which the arrow object temporarily pauses when pointing in the correct answer direction, by additionally inserting a frame at a time point at which the arrow object points in the correct answer direction.

According to an embodiment, the generating of the animation may include generating frames that construct an animation in which the arrow object rotates at a constant speed; and generating an animation in which the arrow object rotates at a speed less than the constant speed when pointing in the correct answer direction, by additionally inserting a frame before or after a time point at which the arrow object points in the correct answer direction.

According to an embodiment, the generating of the animation may include generating frames that construct an animation in which the arrow object rotates at a constant speed; and generating an animation in which the arrow object shakes when pointing in the correct answer direction, by changing orders of previous and next frames at a time point at which the arrow objects points in the correct answer direction in the animation.

According to an embodiment, the generating of the animation may include generating an animation including a first arrow object, which rotates with a movement distinguished from movements in other directions in the correct answer direction, and a second arrow object which rotates at a speed different from a speed of the first arrow object and overlaps with the first arrow object.

According to an embodiment, at least one of tone, saturation, or transparency of the second arrow object may be respectively different from tone, saturation, or transparency of the first arrow object.

According to an embodiment, tone, saturation, and transparency of the second arrow object may be respectively identical to tone, saturation, and transparency of the first arrow object.

According to an embodiment, the receiving of the direction input may include receiving a direction input by a user through direction keys of a keyboard.

According to an embodiment, the CAPTCHA interface may include a direction input interface configured to receive a direction input, and the receiving of the direction input may include receiving, through the direction input interface, a user input of clicking or touching a point that points to a direction.

According to various embodiments of the disclosure, there is provided an electronic device configured to authenticate a user by using CAPTCHA, the electronic device including: a display; a user input unit; a memory configured to store instructions; and a processor functionally connected to the display, the user input unit, and the memory, and configured to execute the instructions. The at least one processor may be configured to determine a correct answer pattern having at least one correct answer direction by executing the instructions, generate, with respect to each of the at least one correct answer direction, an animation of an arrow object rotating with a movement distinguished from movements in other directions with reference to the correct answer direction, display, through the display, a CAPTCHA interface corresponding to the correct answer pattern and including an arrangement of the generated animation, receive a direction input from the user input unit, and determine whether the user has been authenticated according to a result of comparing the received direction input with the correct answer pattern.

According to an embodiment, each of the at least one correct answer direction may be determined as one of up, down, left, and right directions.

According to an embodiment, each of the at least one correct answer direction may be determined as an arbitrary direction.

According to an embodiment, the correct answer pattern has a preset number of correct answer directions, and the CAPTCHA interface may include the preset number of animations of arrow objects.

According to an embodiment, the at least one processor may be configured to generate frames that construct an animation in which the arrow object rotates at a constant speed, and generate an animation in which the arrow object flickers when pointing in the correct answer direction, by removing the arrow object from a frame at a time point at which the arrow object points in the correct answer direction.

According to an embodiment, the at least one processor may be configured to generate frames that construct an animation in which the arrow object rotates at a constant speed, and generate an animation in which the arrow object temporarily pauses when pointing in the correct answer direction, by additionally inserting a frame at a time point at which the arrow points in the correct answer direction.

According to an embodiment, the at least one processor may be configured to generate frames that construct an animation in which the arrow object rotates at a constant speed, and generate an animation in which the arrow object rotates at a speed less than the constant speed when pointing in the correct answer direction, by additionally inserting a frame before or after a time point at which the arrow object points in the correct answer direction.

According to an embodiment, the at least one processor may be configured to generate frames that construct an animation in which the arrow object rotates at a constant speed, and generate an animation in which the arrow object shakes when pointing in the correct answer direction, by changing orders of previous and next frames at a time point at which the arrow object points in the correct answer direction in the animation.

According to an embodiment, the at least one processor may be configured to generate an animation including a first arrow object, which rotates with a movement distinguished from movements in other directions in the correct answer direction, and a second arrow object which rotates at a speed different from a speed of the first arrow object and overlaps with the first arrow object.

According to an embodiment, at least one of tone, saturation, or transparency of the second arrow object may be respectively different from tone, saturation, or transparency of the first arrow object.

According to an embodiment, tone, saturation, and transparency of the second arrow object may be respectively identical to tone, saturation, and transparency of the first arrow object.

According to an embodiment, the user input unit may include a keyboard, and the at least one processor may be configured to receive a direction input by a user through direction keys of the keyboard.

According to an embodiment, the CAPTCHA interface may include a direction input interface configured to receive a direction input, and the at least one processor may be configured to receive, through the direction input interface, a user input of clicking or touching a point that points to a direction.

According to various embodiments of the disclosure, there is provided a user terminal configured to authenticate a user by using CAPTCHA, the user terminal including: a communication configured to receive a user authentication request from a server; a display; a user input unit; a memory configured to store instructions; and at least one processor functionally connected to the communication unit, the display, the user input unit, and the memory, and configured to execute the instructions. The at least one processor may be configured to determine a correct answer pattern having at least one correct answer direction based on the user authentication request by executing the instructions; generate, with respect to each of the at least one correct answer direction, an animation of an arrow object rotating with a movement distinguished from movements in other directions with reference to the correct answer direction, display, through the display, a CAPTCHA interface corresponding to the correct answer pattern and including an arrangement of the generated animations, receive a direction input from the user input unit, determine whether the user has been authenticated according to a result of comparing the received direction input with the correct answer pattern, and control the communication unit to transmit, to the server, whether the user has been authenticated.

According to various embodiments, there is provided a computer program including: determining a correct answer pattern having at least one correct answer direction; generating, with respect to each of the at least one correct answer direction, an animation of an arrow object rotating with a movement distinguished from movements in other directions with reference to the correct answer direction; displaying a CAPTCHA interface corresponding to the correct answer pattern and including an arrangement of the generated animation; receiving a direction input from the user; and determining whether the user has been authenticated according to a result of comparing the received direction input with the correct answer pattern.

According to various embodiments of the disclosure, there is provided a computer-readable recording medium including: determining a correct answer pattern having at least one correct answer direction; generating, with respect to each of the at least one correct answer direction, an animation of an arrow object rotating with a movement distinguished from movements in other directions with reference to the correct answer direction; displaying an CAPTCHA interface corresponding to the correct answer pattern and including an arrangement of the generated animation; receiving a direction input from the user; and determining whether the user has been authenticated according to a result of comparing the received direction input with the correct answer pattern.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a diagram for describing a method of generating an animation of arrow objects, according to an embodiment of the disclosure;

FIG. 6 is a diagram for describing a method of generating an animation of an arrow object, according to another embodiment of the disclosure;

FIGS. 7A to 7D are each a diagram for describing an operation of a CAPTCHA interface, according to an embodiment of the disclosure;

FIG. 8 is a diagram for describing a method of generating an animation of an arrow object, according to another embodiment of the disclosure;

DETAILED DESCRIPTION

Figure 1:
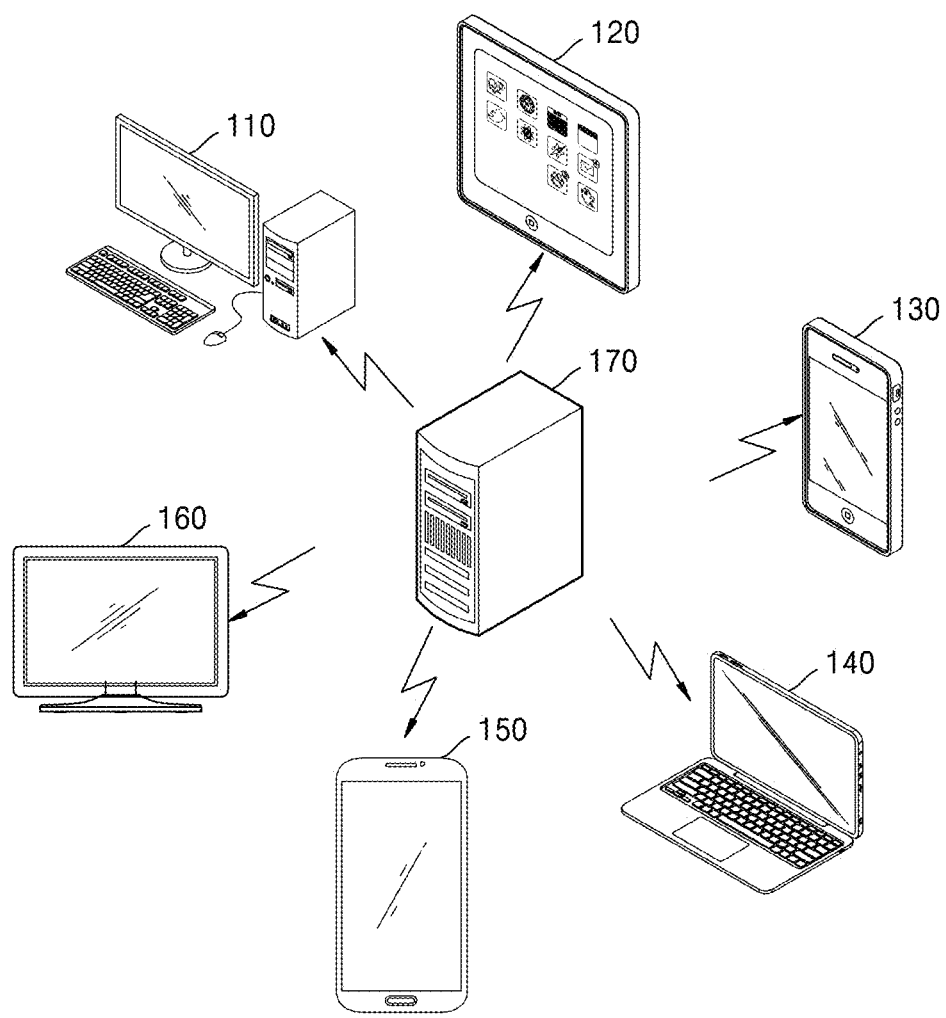
FIG. 1 is a service providing system including a server and a user terminal, according to various embodiments of the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments according to the disclosure will be described in detail with reference to the accompanying drawings. In addition, a method of configuring and using an electronic device according to embodiments of the disclosure will be described in detail with reference to the accompanying drawings. Same reference numerals or marks shown in the respective drawings indicate components or elements substantially performing same functions.

Terms including ordinal numbers such as "first," "second," and the like may be used to describe various elements, but the elements are not limited by the terms. Terms are only used to distinguish one element from other elements. For example, without departing from the scope of right of the disclosure, a first element may be named as a second element, and similarly, the second element may also be named as the first element. The term "and/or" includes a combination of a plurality of related items or any one of a plurality of related items.

Terms used in the present specification is merely used to describe embodiments, and are not used to limit the disclosure. Unless the context clearly differently indicates, singular form expressions include plural form expressions. In the specification, terms such as "comprise" or "include" are intended to denote exist of features, numbers, processes, operations, elements, components or combinations thereof, and are not intended to preclude possibility of exist or addition of one or more other features, numbers, processes, operations, elements, components, or combinations thereof.

Throughout the specification, when a portion is connected to another portion, it includes a case in which the portion is electrically connected to the other portion with a device therebetween, as well as a case in which the portion is directly connected to the other portion. It will be further understood that when a part "includes" or "comprises" an element, unless otherwise defined, the part may further include other elements, not excluding the other elements. Also, the terms such as "unit" or "module" indicate a unit that processes at least one function or operation and may be embodied in a hardware manner, a software manner, or a combination of the hardware manner and the software manner.

In the disclosure described below, control of a user terminal by a server may indicate output by a server from a user terminal (all output devices such as screen display, audio output, vibration output, and lamp emission in the user terminal) through communication with the user terminal and providing data for the user terminal to perform certain operations. The user terminal may also control output from the user terminal by using data stored in advance, and the disclosure is not limited thereto.

In the disclosure described below, transmitting/receiving information or data to/from the user (or a user account) may include transmitting/receiving information or data to/from a device (or the user terminal) corresponding to or connected to the user (or the user account).

In the disclosure described below, the user account corresponding to the user terminal may include a user account that has logged in or connected to a service through the user terminal or a user account for which the user terminal stores information. Also, the user terminal of the user account may indicate a user terminal from which the user account logged in, a user terminal storing user account information, or a user terminal from which the user account accesses.

In the disclosure described below, a user, a player, and a user account may be used as same meanings. It will be understood that the user terminal in the disclosure may indicate, according to context, a user, a player, and a user account, or a device used by the user, the player, and the user account. It will be understood that the user, the player, the user account may indicate, according to context, an avatar character manipulated by the user, the player, and the user account or a device used by the user, the player, and the user account.

FIG. 1 shows a service providing system including a server and a user terminal, according to various embodiments of the disclosure.

A system 100 of the disclosure may include a server 170 and at least one user terminal 110 to 160. The server 170 may provide services including various online activities through a network. The server 170 may simultaneously provide online activities to the at least one user terminal 110 to 160.

According to an embodiment of the disclosure, the server 170 may include a single server, a group of servers, a cloud server, but is not limited to the examples. The server 170 may provide various online activities, and may include database storing data for the online activities. In addition, the server 170 may include a payment server for generating and processing payment events. In an embodiment, the server 170 may include a game providing apparatus.

According to an embodiment of the disclosure, a network indicates a connection established (or formed) by using any communication methods, and may indicate a communication network connected by any communication methods, which receives and transmits data between terminals or between a terminal and a server.

Any communication methods may include communication methods such as communication through a certain communication protocol, a certain frequency band, a certain protocol, or a certain channel. For example, the communication methods may include communication methods through bluetooth, Bluetooth Low Energy (BLE), Wireless Fidelity (Wi-Fi), Zigbee, 3rd Generation (3G), Long-Term Evolution (LTE), and ultrasonic wave, and may include all of near-field communication, far field communication, wireless communication, and wired communication. However, the communication methods are not limited to the above-stated examples.

According to an embodiment of the disclosure, the near-field communication may indicate a communication method in which communication is available only when devices (terminals or servers) are within a certain range, and may include, for example, Bluetooth, near-field communication (NFC), and the like. A far field communication method may indicate a communication method in which devices performing communications may communicate with each other regardless of a distance therebetween. For example, the far-field communication may indicate a method by which two devices communicating through a communicator such as AP may communicate with each other even when the two devices are apart from each other in a certain distance or further, and may include communication methods by using cellular networks (3G, LTE) such as short message service (SMS) or calling. However, the far-field communication method is not limited to the above-stated examples. Being provided with online activities through a network may include availability of communication between a server and a terminal by all communication methods. In an embodiment, information received and transmitted between the user terminal 110 and the server 170 may be encrypted.

Throughout the specification, the at least one user terminal 110 to 160 may include various electronic devices such as a navigation device, an MP3 player, a digital camera, a refrigerator, a washing machine, a vacuum cleaner, as well as a personal computer 110, a tablet 120, a cellular phone 130, a notebook 140, a smart phone 150, and a TV, and is not limited to the above-stated examples. In an embodiment, the at least one user terminal 110 to 160 may include a game providing apparatus.

According to an embodiment of the disclosure, online activities may include online games, portal services, and social network service (SNS), and are limited to the above-stated examples. In addition, the online games may include various genres such as sports, Massive Multiplayer Online Role Reproducing Game (MMORPG), Aeon of Strife (AOS), First Person Shooter (FPS), Trading Card Game (TCG), Collectible Card Game (CCG), and the like. Also, the online games may include match type game between a user and another user, and may also include a match type game between a user and a computer (for example, artificial intelligence). In addition, the online games may also include construction or decoration types of games, not the match type game. The online games are not limited thereto, and types of the online games are non-limited.

According to various embodiments of the disclosure, the server 170 may request user authentication to the user terminals 110 to 160 that attempt to use services or are in use of services. The server 170 may, based on user authentication results of the user terminal 110 to 160, permit the user to use the services, block the user from accessing the service, or request the user for re-authentication.

According to various embodiments of the disclosure, the user terminal 110 to 160 may request the user to perform user authentication by using CAPTCHA, based on receipt of the user authentication request from the server 170. In an embodiment, the user terminals 110 to 160 may determine a correct answer pattern having at least one correct answer direction, generate, with respect to each of the at least one correct answer direction, an animation of an arrow object rotating with a movement distinguished from movements in other directions with reference to the correct answer direction, display a CAPTCHA interface corresponding to the correct answer pattern and including an arrangement of the generated animation, and determine whether the user has been authenticated according to a result of comparing the received direction input with the correct answer pattern. The user terminals 110 to 160 may transmit a result of user authentication to the server 170.

In another embodiment, the user terminal 110 to 160 may determine without request from the server 170 that user authentication is required, and may request the user to perform user authentication by using CAPTCHA. The user terminal 110 to 160 may permit the user to use the service or block the user from using the service according to the result of user authentication.

Figure 2:
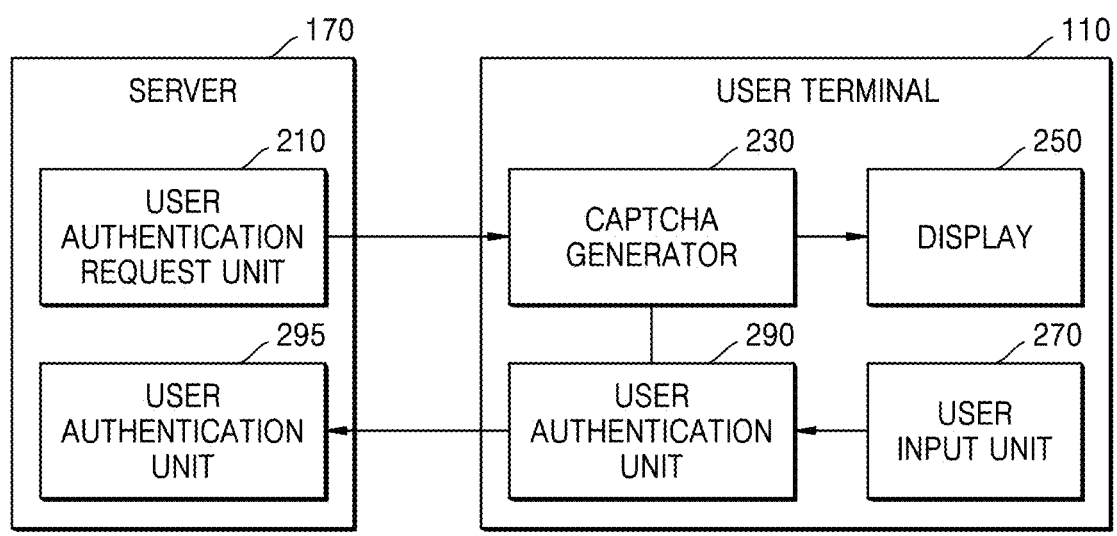
FIG. 2 is a diagram for describing a system for authenticating a user by using CAPTCHA, according to various embodiments of the disclosure.

FIG. 2 is a diagram for describing a system configured to perform user authentication by using CAPTCHA, according to various embodiments of the disclosure.

Referring to FIG. 2, the system configured to perform user authentication by using CAPTCHA may include the user terminal 110 and the server 170. The user terminal 110, which is an electronic device configured to provide the user with an online game provided by the server 170, may correspond to the user terminals 110 to 160 shown in FIG. 1. In various embodiments, the user terminal 110 may include a CAPTCHA generator 230, a display 250, a user input unit 270, and a user authentication unit 290.

The server 170, which is a server device configured to provide services, may correspond to the server 170 shown in FIG. 1. In various embodiments, the server 170 may include a user authentication request unit 210 and a user authentication unit 295.

The user authentication request unit 210 may determine that user authentication is required for the user who attempts to use the services or is in use of the services. In an embodiment, the user authentication request unit 210 may require user authentication when the user logs in the service. In an embodiment, the user authentication request unit 210 may require user authentication when the user performs a certain online activity that is preset as requiring user authentication.

In an embodiment, the user authentication request unit 210 may require user authentication when it is determined that the user is doubted as a machine. For example, the user authentication request unit 210 may detect abnormal activities of the user in real-time, and may require user authentication to the user whose abnormal activities are detected. Abnormal activities of the user may include performance of a large amount of online activities by the user during a short time period, repetition of same operations by the user, a sudden change in the value of a user account, change in account information by the user, trade with another user doubted as an abnormal user, and the like. However, the abnormal activities of the user are not limited to the above-stated examples.

The CAPTCHA generator 230 may generate CAPTCHA to distinguish whether the user is a human being or a machine, in response to the user authentication request received from the user authentication request unit 210. According to various embodiments of the disclosure, the CAPTCHA generator 230 may generate an animation-based direction input CAPTCHA.

In various embodiments, the CAPTCHA generator 230 may determine a correct answer pattern having at least one correct answer direction. In an embodiment, the correct answer pattern may include a direction arrangement having a combination of a plurality of directions. In an embodiment, the correct answer pattern may have a preset number of correct answer directions.

In various embodiments, the CAPTCHA generator 230 may, for each of the at least one correct answer directions, generate an animation of an arrow object that rotates with a movement distinguished from movements in other directions with reference to the correct answer direction. In an embodiment, the CAPTCHA generator 230 may generate a certain number of animations of arrow objects respectively corresponding to the certain number of correct answer directions.

In various embodiments, the CAPTCHA generator 230 may generate an animation in which each arrow object rotates at a constant speed and takes a certain distinguished movement when pointing in the correct answer direction. In an embodiment, the CAPTCHA generator 230 may generate an animation in which the arrow object flickers when pointing in the correct answer direction. In an embodiment, the CAPTCHA generator may generate an animation in which the arrow object temporarily pauses when pointing in the correct answer direction. In an embodiment, the CAPTCHA generator 230 may generate an animation in which the arrow object rotates at a lower speed when pointing to the correct answer direction. In an embodiment, the CAPTCHA generator 230 may generate an animation in which the arrow object shakes when pointing in the correct answer direction.

In an embodiment, the CAPTCHA generator 230 may generate an animation including: a first arrow object, which rotates with a movement distinguished from movements in other directions with reference to the correct answer direction; and a second arrow object which rotates at a different speed from that of the first arrow object and overlaps with the first arrow object. In an embodiment, at least one of tone, saturation, or transparency of the second arrow object may be respectively different from tone, saturation, or transparency of the first arrow object. In an embodiment, tone, saturation, and transparency of the second arrow object may be respectively identical to tone, saturation, or transparency of the first arrow object.

In various embodiments, the CAPTCHA generator 230 may generate a CAPTCHA interface including an arrangement of the generated animations of the arrow objects. The CAPTCHA generate 230 may display the CAPTCHA interface through the display 250. The CAPTCHA generator 230 may, through the display 250, request the user to input the correct answer pattern.

The display 250 may display and output information processed by the user terminal 110. In various embodiments, the display 250 may display the CAPTCHA interface generated by the CAPTCHA generator 230. In an embodiment, the display 250 may display a direction input interface to input correct answers of CAPTCHA.

The user input unit 270 indicates a device by which the user inputs data to control the user terminal 110. For example, the user input unit 270 may include devices capable of receiving various types of user inputs, for example, a keyboard, a physical button, a mouse, a joystick, a touch-screen, a touchpad, a camera, a microphone, and the like. In various embodiments, after the CAPTCHA interface is displayed, the user input unit 270 may receive, from a user, a direction input to input a correct answer for CAPTCHA.

The user authentication unit 290 of the user terminal 110 may compare the direction input, which is received from the user input unit 270, to a correct answer pattern determined by the CAPTCHA generator, to determine whether the user has input the correct answer for CAPTCHA. In an embodiment, when the correct answer direction is determined as one of the certain number of directions (for example, four-direction, eight-direction, sixteen-direction, or the like), the electronic device may determine whether the received direction inputs are totally identical to the entire correct answer pattern. In another embodiment, when the correct answer direction is determined as an arbitrary direction, the electronic device may determine whether the received direction inputs are identical to correct answer directions constructing the correct answer pattern within a certain error range. In an embodiment, the user authentication unit 290 may transmit a result of the determination to the server 170.

The user authentication unit 295 of the server 170 may determine whether the user has been authenticated according to the result of the determination received from the user terminal 110. When the user has input the correct answer for CAPTCHA, the user authentication unit 295 may determine the user as a human and permit the user to use the services. When the user has failed to input the correct answer for CAPTCHA, the user authentication unit 295 may determine the user as a machine and block the user from using the services. In an embodiment, when the user has failed to input the correct answer for CAPTCHA, the user authentication request unit 210 may request again the user authentication.

In an embodiment, some or all of functions of the user authentication request unit 210 and the user authentication unit 295 of the server may be performed by the user terminal 110. For example, the user terminal 110 may independently determine whether to perform user authentication, without request from the server 170. For example, the user terminal 110 may provide the user with the services of the server 170 or block the user therefrom according to whether the user has input the correct answer for CAPTCHA.

In another embodiment, some or all of functions of the CAPTCHA generator 230 and the user authentication unit 290 of the user terminal 110 may be performed by the server 170. For example, the server 170 may determine the correct answer pattern of CAPTCHA and transmit the correct answer pattern to the user terminal 110. In this case, based on the correct answer pattern received from the server 170, the user terminal 110 may generate an animation of a rotating arrow which has a movement distinguished from those of other directions with reference to the correct answer direction. For example, the user terminal 110 may transmit, to the server 170, the direction input by the user received from the user input unit 270. The server 170 may determine whether the user is authenticated by comparing the direction input by the user, which is received from the user terminal 110, to the correct answer pattern.

Figure 3:
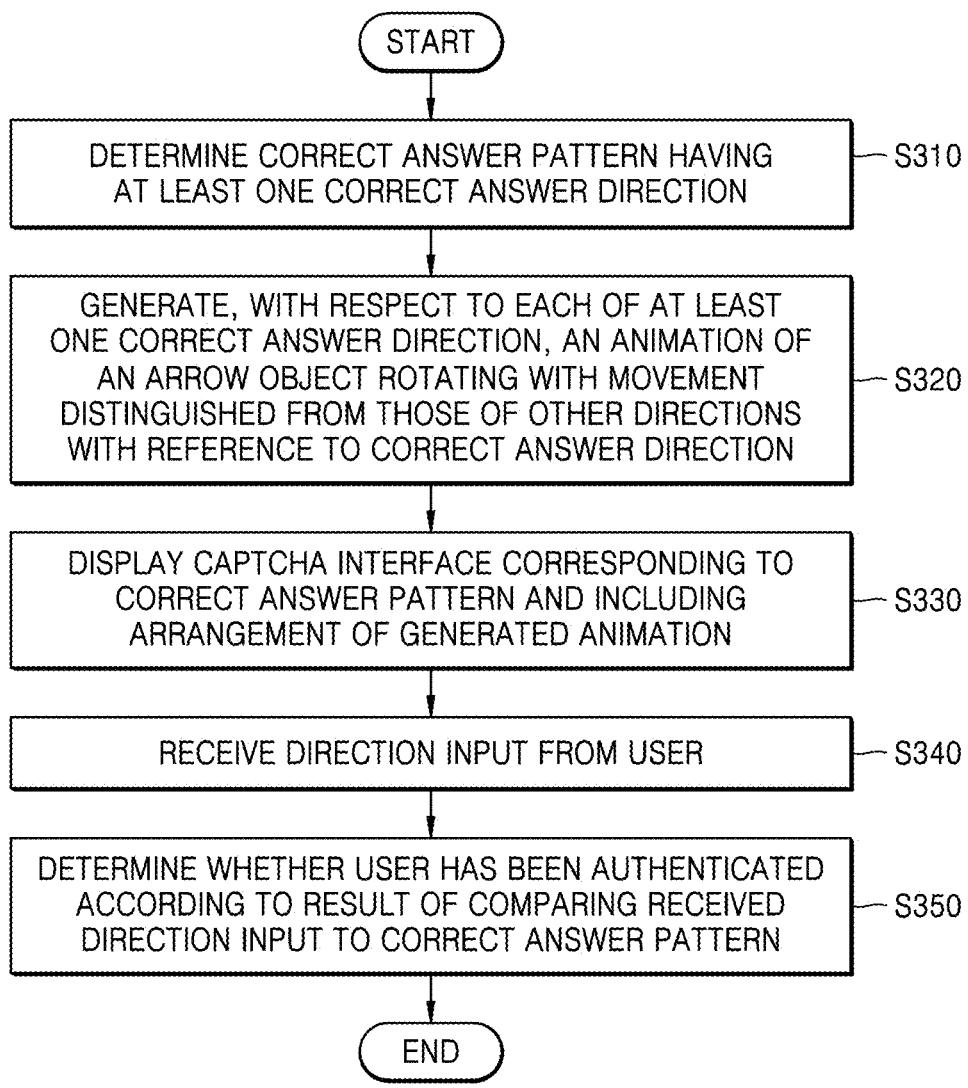
FIG. 3 is a flowchart of a method of authenticating a user by using CAPTCHA, according to various embodiments of the disclosure.

FIG. 3 is a flowchart of a method of authenticating the user by using CAPTCHA, according to various embodiments of the disclosure. This kind of operation may be performed by the user terminals 110 to 160 and the server 170 shown in FIG. 1, the user terminals 110 and the server 170 shown in FIG. 2, and an electronic device 1400 or a processor 1410 of the electronic device 1400 shown in FIG. 14.

Referring to FIG. 3, in S310, the electronic device may determine a correct answer pattern having at least one correct answer pattern. In an embodiment, the correct answer pattern may include a direction arrangement having a combination of a plurality of directions. In an embodiment, the correct answer pattern may have a preset number of correct answer directions.

In an embodiment, the correct answer directions may each be determined as one of up, down, left, and right directions. In this case, the correct answer pattern may include an arrangement type having a combination of up, down, left, and right directions. For example, the correct answer pattern may have an arrangement type such as 'right-up-left-up' or 'left-up-down-down-right'. In an embodiment, the correct answer direction may be determined as one of the certain number of directions. For example, the correct answer pattern may be determined as one of eight-direction or sixteen-direction.

In another embodiment, the correct answer direction may be determined as an arbitrary direction. In this case, at least one correct answer direction may be indicated as an angle measured from a certain reference direction. For example, when an up direction is the reference direction, the correct answer direction may be indicated as an angle measured in a clockwise direction from the reference direction. In this case, the correct answer pattern may have types such as {235, 30, 75, 110} or {142, 313, 90, 228, 57}.

In S320, the electronic device may, for each of the at least one correct answer direction, generate an animation of an arrow object rotating with a movement distinguished from movements in other directions with reference to the correct answer direction. In an embodiment, the electronic device may generate a certain number of animations of arrow objects respectively corresponding to the certain number of correct answer directions. For example, when the correct answer pattern has four correct answer directions, the electronic device may generate four animations of rotating arrow objects respectively related to the correct answer directions.

In various embodiments, the electronic device may generate an animation in which each of the arrow objects rotates at a certain speed and takes a specific movement when pointing in the correct answer direction. In an embodiment, the electronic device may generate an animation in which the arrow object flickers when pointing in the correct answer direction. In an embodiment, the electronic device may generate an animation in which the arrow object temporarily pauses when pointing in the correct answer direction. In an embodiment, the electronic device may generate an animation in which the arrow object rotates at a lower speed when pointing in the correct answer direction. In an embodiment, the electronic device may generate an animation in which the arrow object shakes when pointing in the correct answer direction.

In an embodiment, the electronic device may generate an animation including: a first arrow object which rotates with a movement distinguished from movements in other directions with reference to the correct answer direction; and a second arrow object which rotates at a speed different from a speed of the first arrow object and overlaps with the first arrow object. In an embodiment, at least one of tone, saturation, or transparency of the second arrow object may be respectively different tone, saturation, or transparency of the first arrow object. In another embodiment, tone, saturation, and transparency of the second arrow object may be respectively identical to tone, saturation, and transparency of the first arrow object.

In S330, the electronic device may display the CAPTCHA interface including an arrangement of animations of the arrow objects corresponding to the correct answer patterns. In an embodiment, the electronic device may request the user to input the correct answer pattern. In an embodiment, the electronic device may display a direction input interface to input the correct answer for CAPTCHA.

In S340, the electronic device may receive a direction input from the user. In an embodiment, when the correct answer direction is determined as one direction from among up, down, left, and right, the electronic device may receive direction inputs by the user through direction keys of a keyboard. In another embodiment, the electronic device may receive, through the direction input interface, a user input of clicking or touching points indicating directions.

In S350, the electronic device may determine whether the user has been authenticated, according to a result of comparing the received direction input to the correct answer pattern. In an embodiment, when the correct answer direction is determined as one of the certain number of directions (for example, four-direction, eight-direction, sixteen-direction, or the like), the electronic device may determine whether the received direction inputs are totally identical to the entire correct answer pattern. In another embodiment, when the correct answer direction is determined as an arbitrary direction, the electronic device may determine whether the received direction inputs are identical to correct answer directions constructing the correct answer pattern within a certain error range.

When the received direction inputs are identical to the correct answer pattern, the electronic device may determine the user as a human and permit the user to use the services. In an embodiment, when the received direction inputs are not identical to the correct answer pattern, the electronic device may determine the user as a machine and block the user from using the services. In an embodiment, when the received direction inputs are not identical to the correct answer pattern, the electronic device may return to S310 and determine a new correct answer pattern, and may display a CAPTCHA interface including an animation of arrow objects corresponding to the new correct answer pattern.

According to the above-described embodiments, there is provided a CAPTCHA presenting a rotating arrow having a distinguished movement in a correct answer direction and requesting the user to input a correct answer direction. With respect to the above-described CAPTCHA, the user may not distinguish correct answers by using a still screen, and may distinguish correct answers only by recognizing changes in the movements of the arrow object in specific directions. As for videos, the difficulty for the computer to analyze and recognize the correct answer is much higher than that for a fixed image. On the contrary, humans may very promptly, accurately, and easily perform processing on the movements. Accordingly, CAPTCHA according to embodiments of the disclosure may not be easily avoided by automation programs, and humans and automation programs may be more efficiently and easily distinguished from each other by using CAPTCHA according to embodiments of the disclosure.

Figure 4:
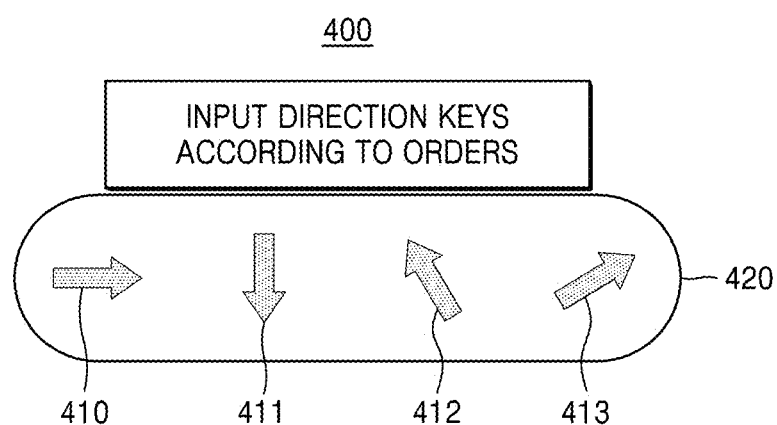
FIG. 4 is a diagram for describing a CAPTCHA interface, according to various embodiments of the disclosure.

FIG. 4 is a diagram for describing a CAPTCHA interface, according to various embodiments of the disclosure; A CAPTCHA interface 400 may include an interface that displays automatically generated questions and requests responses of the user for questions to distinguish whether the user is a human or a machine.

According to various embodiments of the disclosure, the CAPTCHA interface 400 may include a question interface 420 including one or more rotating arrow objects 411, 411, 412, and 413 corresponding to a correct answer pattern. However, the CAPTCHA interface 400 is not limited to the example shown in FIG. 4, and more configurations than shown in FIG. 4 may be included in the CAPTCHA interface 400, or less configurations than shown in FIG. 4 may be included in the CAPTCHA interface 400. For example, FIG. 4 only illustrates four arrow objects, but this is limited to a case in which the correct answer pattern has four correct answer directions, and the number of arrow objects may be more or less according to the number of correct answer directions constructing the correct answer pattern.

According to various embodiments of the disclosure, the arrow objects 410, 411, 412, and 413 may each correspond to one correct answer included in the correct answer pattern, and may each be configured to rotate to have a movement distinguished from those of other directions with reference to the correct answer direction. In various embodiments, the arrow objects 410, 411, 412, and 413 may be configured to rotate at a constant speed and take a certain distinguished movement when pointing in the correct answer directions. For example, when the correct answer pattern is determined as 'right-down-down-left', the first arrow object 410 may be configured to take a certain movement when pointing to a right direction, the second arrow object 411 and the third arrow object 412 may be configured to take a certain movement when pointing in a down direction, and the fourth arrow object 413 may be configured to take a certain movement when pointing in a left direction.

In an embodiment, the arrow objects 410, 411, 412, and 413 may all have a constant basic rotation speed and a constant rotation direction. In other words, when not pointing to the correct answer direction, the arrow objects 410, 411, 412, and 413 may all rotate at a same speed and in a same direction. In another embodiment, a basic rotation speed and a basic rotation direction may be determined for each of the arrow objects 410, 411, 412, and 413. In other words, when not pointing in the correct answer direction, the arrow objects 410, 411, 412, and 413 may respectively rotate at different speeds and in different directions.

In an embodiment, a direction in which each of the arrow objects 410, 411, 412, and 413 initially points may be arbitrarily determined. That is, the arrow objects 410, 411, 412, and 413 may be displayed on a screen to point to arbitrary initial directions, and may be configured to rotate at constant speeds from the initial directions and take distinguished movement with reference to the correct answer directions.

According to various embodiments of the disclosure, a question interface 420 may include an interface including an arrangement of a series of arrow objects 410, 411, 412, and 413 corresponding to the correct answer pattern. In an embodiment, the question interface 420 may request the user to input correct answers for CAPTCHA. In an embodiment, the question interface 420 may overlay on a background screen.

Figure 5:
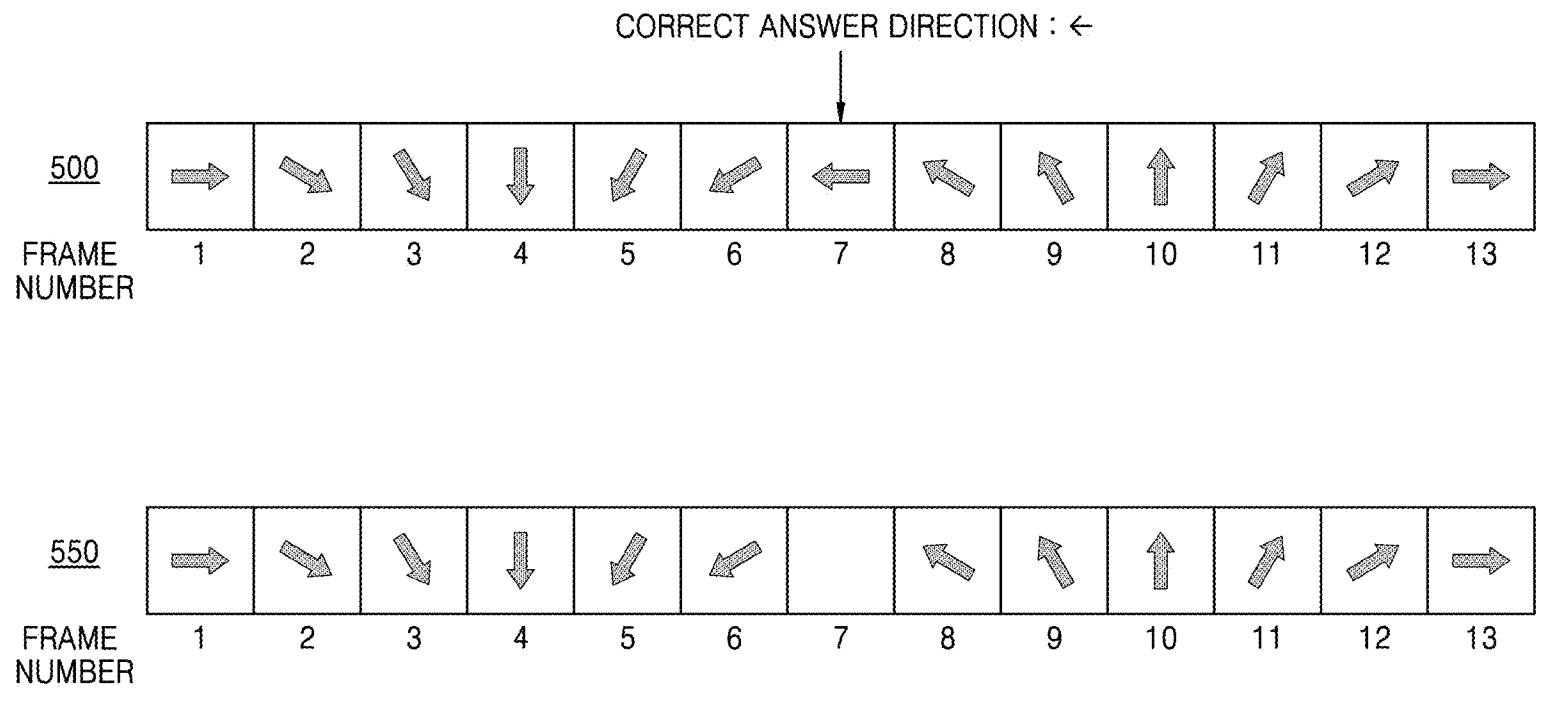

FIG. 5 is a diagram for describing a method of generating an animation of an arrow object, according to an embodiment of the disclosure.

Referring to FIG. 5, there are shown: basic frames 500 for constructing an animation in which the arrow object rotates once at a constant speed; and modified frames 550 constructing an animation in which the arrow object takes a distinguished movement in the correct answer direction.

In an embodiment, the electronic device may generate the basic frames 500 constructing the animation in which the arrow object rotates at a constant speed. For convenience of explanation, shown is an example in which one rotation of the arrow object has twelve frames. However, it will be easily understood by those of ordinary skill in the art that the number of the frames may be different from the shown example according to the number of frames per second and a rotation speed of the arrow object. For example, when fps is thirty and the arrow object is configured to perform one rotation per second, thirty frames may be generated to construct an animation in which the arrow object performs one rotation.

In an embodiment, the electronic device may recognize, from among the basic frames 500, a frame at a time point at which the arrow object points in the correct answer direction. For example, when the correct answer direction is the left direction (←), the electronic device may determine a frame (a seventh frame), in which the arrow object points in the left direction, as a frame for the correct answer direction. When there is no frame in which the arrow object precisely points in the correct answer direction, the electronic device may determine a frame, in which the arrow object points in a direction closest to the correct answer direction, as the frame for the correct answer direction.

In an embodiment, the electronic device may generate the modified frames 550 by deleting the arrow object from the distinguished frame for the correct answer direction. In an embodiment, the electronic device may generate the modified frames 550 by deleting the arrow objects from the frame for the correct answer direction and certain frames adjacent to the correct answer direction. By continuously reproducing the modified frames 550 generated as described above, an animation in which the arrow object rotates at a constant speed and flickers when pointing in the correct answer direction may be generated.

Figure 6:
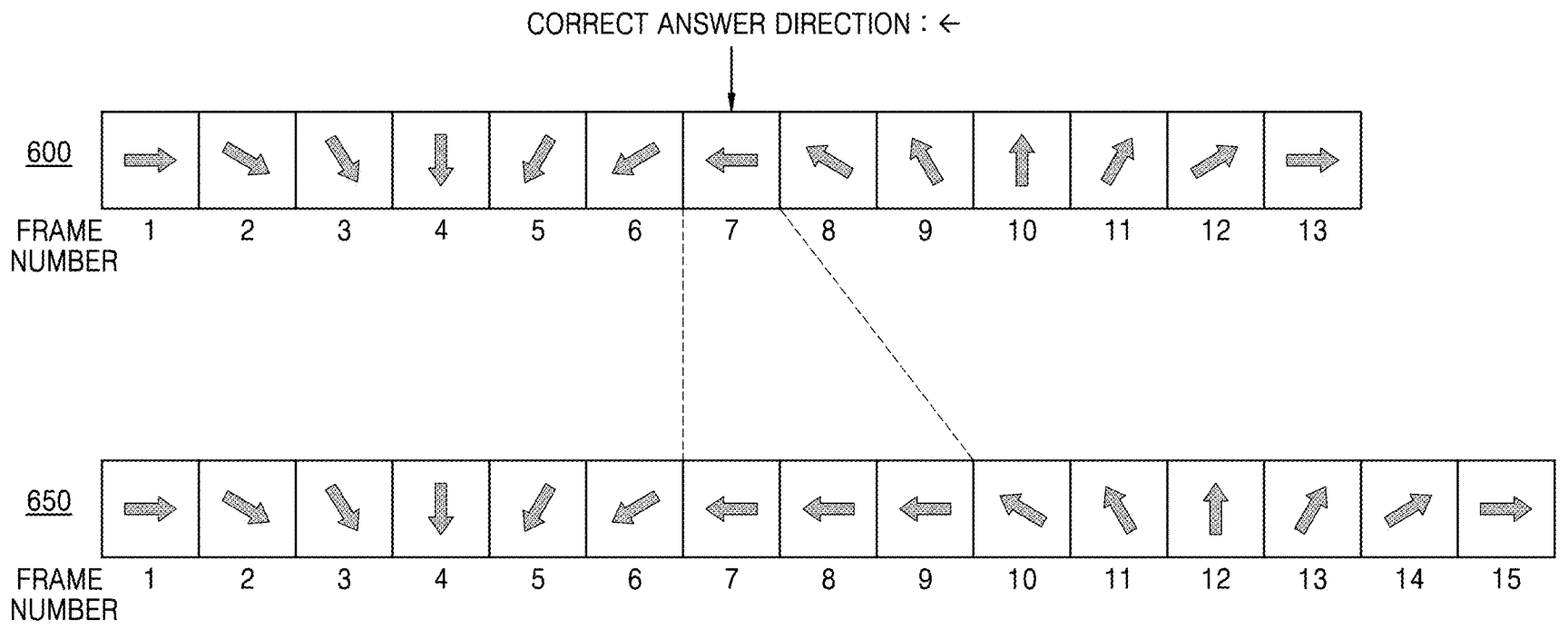

FIG. 6 is a diagram for describing a method of generating an animation of an arrow object, according to another embodiment of the disclosure.

Referring to FIG. 6, there are shown: basic frames 600 for generating an animation of one arrow object, the basic frames 600 constructing an animation in which the arrow object rotates once at a constant speed; and modified frames 650 constructing an animation in which the arrow object takes a distinguished movement in the correct answer direction. As the basic frames 600 correspond to the basic frames 500 shown in FIG. 5, repeated descriptions will not be given.

In an embodiment, the electronic device may distinguish, from among the basic frames 600, a frame at a time point at which an arrow object points in a correct answer direction. When there is no frame in which the arrow object precisely points to the correct answer direction, the electronic device may determine a frame, in which the arrow object points in a direction closes to the correct answer direction, as a frame for the correct answer direction.

In an embodiment, the electronic device may generate the modified frames 650 by additionally inserting same frames before or after the distinguished frame for the correct answer direction. The number of additionally inserted frames may be preset. By continuously reproducing the modified frames 650 generated as described above, an animation in which the arrow object rotates at a constant speed and temporarily pauses when pointing in the correct answer direction may be generated.

FIGS. 7A through 7D are each a diagram for describing an operation of a CAPTCHA interface, according to an embodiment of the disclosure;

Referring to FIGS. 7A through 7D, shown is an example in which the CAPTCHA interface, which includes the arrow objects 410, 411, 412, and 413 that rotate with a distinguished movement in the correct answer directions, changes in each frame. FIGS. 7A through 7D each illustrates an example according to the embodiment shown in FIG. 6, in which each of the arrow objects 410, 411, 412, and 413 and temporarily pauses when pointing in the correct answer direction. However, the example is not limited thereto. In addition, although FIGS. 7A through 7D only illustrate four arrow objects, this is limited to a case in which the correct answer pattern has four correct answer directions, and the number of arrow objects may be more or less according to the number of correct answer directions included in the correct answer pattern.

In an embodiment, the electronic device may determine the correct answer pattern, and may generate an animation in which the arrow objects 410, 411, 412, and 413 respectively correspond to correct answer directions included in the correct answer pattern and each rotate to have a movement distinguished from those of other directions with reference to the correct answer direction. The electronic device may display the CAPTCHA interface including an animation arrangement of the generated arrow objects 410, 411, 412, and 413.

In an embodiment, a direction to which each of the arrow objects 410, 411, 412, and 413 initially points may be arbitrarily determined. The electronic device may display, in a first frame, each of the arrow objects pointing to the direction. Afterwards, every time the frame is changed, each of the arrow objects 410, 411, 412, and 413 may rotate at a certain angle and displayed according to the number of frames per second and the rotation speed. As the arrow objects 410, 411, 412, and 413 rotate at a constant speed, the arrow objects 410, 411, 412, and 413 may rotate at a constant angle in each frame.

However, when the arrow objects 410, 411, 412, and 413 point in the correct answer directions, the arrow objects may differently move according to preset conditions. In an embodiment, the arrow objects 410, 411, 412, and 413 may be deleted from a frame pointing in the correct answer direction or a previous/next frame thereof. In this case, it is seen that the corresponding arrow objects flicker in the correct answer direction. In another embodiment, the arrow objects 410, 411, 412, and 413 may be fixed without rotation for a certain frame after the frame pointing in the correct answer direction. In this case, it is seen that the corresponding arrow object temporarily pauses in the correct answer direction.

For example, FIGS. 7A to 7D illustrate an example in which the arrow objects 410, 411, 412, and 413 move when the correct answer pattern includes 'right-down-down-left (←↓↓→)'. From first to sixteenth frames, the arrow objects 410, 411, 412, and 413 all rotate at a constant speed per frame when pointing to directions other than the correct answer direction, but temporarily pause when pointing in the correct answer direction. In thirteenth to fifteenth frames, the first arrow object 410 pauses pointing in the right direction, that is, the correct answer direction. In the first to third frames, the second arrow object 411 pauses pointing in the down direction, that is, the correct answer direction. In the eighth to tenth frames, the third arrow object 412 pauses pointing in the down direction. In the eighth to tenth frames, the fourth arrow object 413 pauses pointing in the left direction.

As described, it is difficult for computers to recognize motions from video. However, automation programs may capture many frames and attempt to find correct answer directions by a probabilistic method. For example, according to a method of deleting an arrow object from the frame as in the embodiment shown in FIG. 5, an automation program may capture the frames and estimate the correct answer direction from a frame without the arrow objects from among the frames. As another example, according to a method of inserting a same frame as in the embodiment shown in FIG. 6, the automation program may capture the frames and may estimate a direction, to which the arrow objects frequently point, as the correct answer direction.

Accordingly, to prevent such attempts, other embodiments of the disclosure are proposed with reference to FIGS. 8 to 11.

FIG. 8 is a diagram for describing a method of generating an animation of an arrow object, according to another embodiment of the disclosure.

Referring to FIG. 8, there are shown: basic frames 800 for generating an animation of one arrow object, the basic frames 800 constructing an animation in which an animation in which the arrow object rotates once at a constant speed; and modified frames 850 constructing an animation in which the arrow object takes a distinguished movement in the correct answer direction. As the basic frames 800 correspond to the basic frames 500 shown in FIG. 5, repeated descriptions will not be given.

In an embodiment, the electronic device may distinguish, from among the basic frames 800, a frame at a time point at which an arrow object points in a correct answer direction. When there is no frame in which the arrow object precisely points to the correct answer direction, the electronic device may determine a frame, in which the arrow object points to a direction closest to the correct answer direction, as the frame for the correct answer direction.

In an embodiment, the electronic device may generate the modified frames 850 by additionally inserting a frame before or after the distinguished frame for the correct answer direction. The additionally inserted frame may include a frame indicating an intermediate state between the frame for the correct answer direction and previous/next frames thereof. By continuously reproducing the modified frames 850 generated as described above, an animation in which the arrow object rotates at a constant speed and slows down when pointing in the correct answer direction may be generated.

In an embodiment, the number of additionally inserted frames may be preset. Although FIG. 8 shows an example in which one frame is inserted each before and after the frame in the correct answer direction, the embodiment is not limited thereto, and two or more frames may be inserted each before and after the frame in the correct answer direction.

Figure 9:
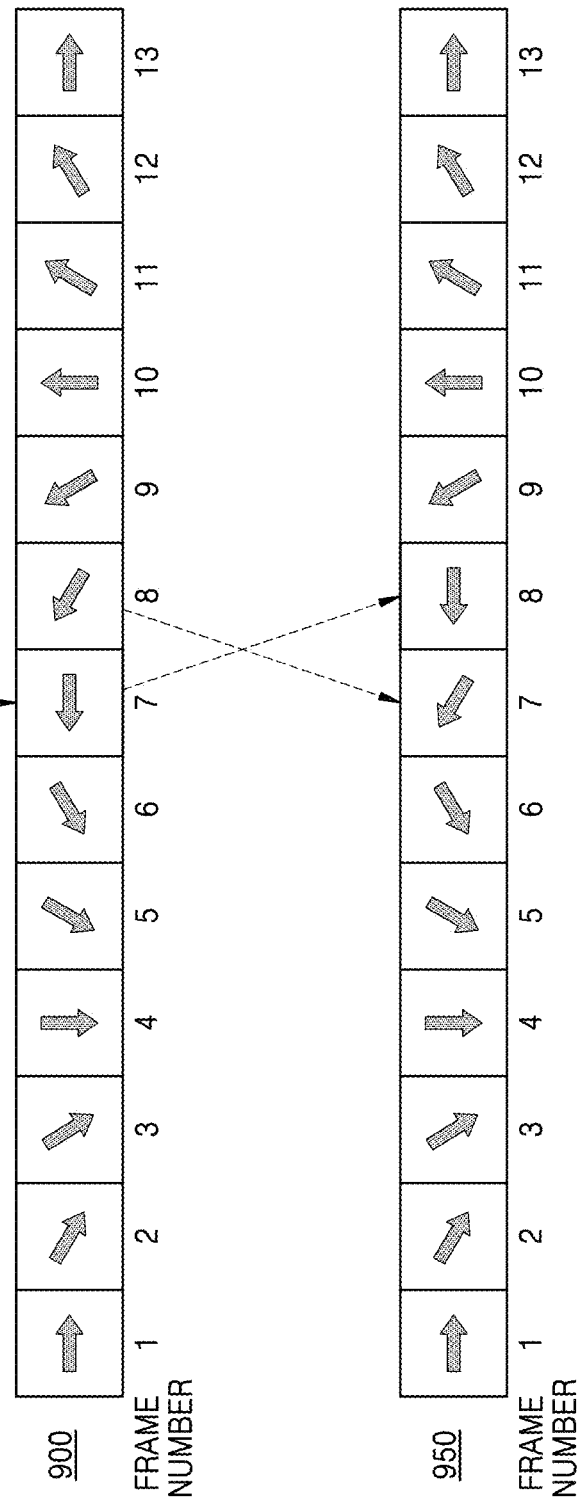
FIG. 9 is a diagram for describing a method of generating an animation of an arrow object, according to another embodiment of the disclosure.

FIG. 9 is a diagram for describing a method of generating an animation of an arrow object, according to another embodiment of the disclosure.

Referring to FIG. 9, there are shown: basic frames 900 for generating an animation of one arrow object, the basic frames 900 constructing an animation in which the arrow object rotates once at a constant speed; and modified frames 950 constructing an animation in which the arrow object takes a distinguished movement in the correct answer direction. As the basic frames 900 correspond to the basic frames 500 shown in FIG. 5, repeated descriptions will not be given.

In an embodiment, the electronic device may distinguish, from among the basic frames 900, a frame at a time point at which an arrow object points in a correct answer direction. When there is no frame in which the arrow object precisely points to the correct answer direction, the electronic device may determine a frame, in which the arrow object points in a direction closest to the correct answer direction, as the frame for the correct answer direction.

In an embodiment, the electronic device may generate the modified frames 950 by changing orders of the frame for the correct answer direction and a previous/next frame of the frame for the correct answer direction. By continuously reproducing the modified frames 950 generated as described above, an animation in which the arrow object rotates at a constant speed but shakes when pointing in the correct answer direction may be generated.

According to embodiments described above, arrow objects in the respective frames all point to different directions, and there is no difference between frequencies of directions pointed by the arrow objects. Accordingly, it is possible to prevent attempts by automation programs to find correct answer directions in a probabilistic method by capturing a plurality of frames.

Figure 10:
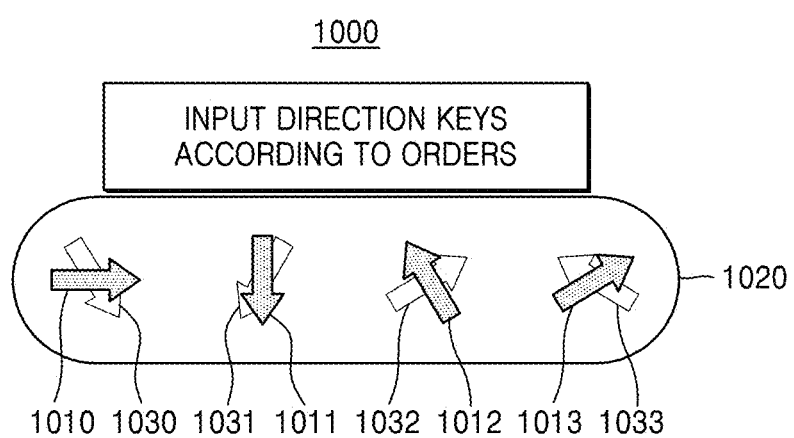
FIG. 10 is a diagram for describing a CAPTCHA interface, according to various embodiments of the disclosure.

FIG. 10 is a diagram for describing a CAPTCHA interface, according to various embodiments of the disclosure.

According to various embodiments of the disclosure, the CAPTCHA interface 1000 may include a question interface 1020 including first arrow objects 1010, 1011, 1012, and 1013 and second arrow objects 1030, 1031, 1032, and 1033. However, the CAPTCHA interface 1000 is not limited to the example shown in FIG. 10, and components more or less than those of FIG. 10 may be included in the CAPTCHA interface 1000. For example, FIG. 10 only illustrates four arrow objects, but this is limited to a case in which the correct answer pattern has four correct answer directions, and the number of arrow objects may be more or less according to the number of correct answer directions constructing the correct answer pattern.

According to various embodiments of the disclosure, the first arrow objects 1010, 1011, 1012, and 1013 may each correspond to one correct answer direction included in the correct answer pattern and may be configured to rotate to have a movement distinguished from those of other directions with reference to the correct answer direction. In various embodiments, the first arrow objects 1010, 1011, 1012, and 1013 may be configured to rotate at a constant speed and take certain distinguished movements when pointing in the correct answer directions. As the first arrow objects 1010, 1011, 1012, and 1013 may correspond to the arrow objects 410, 411, 412, and 413 shown in FIG. 4, repeated descriptions will not be given. A method of generating animations of the first arrow objects 1010, 1011, 1012, and 1013 may be based on various embodiments described above with reference to FIGS. 5 to 9.

According to various embodiments of the disclosure, the second arrow objects 1030, 1031, 1032, and 1033 may be respectively overlap with the first arrow objects 1010, 1011, 1012, and 1013 and may be configured to rotate at a speed different from a speed of the first arrow objects 1010, 1011, 1012, and 1013. The second arrow objects 1030, 1031, 1032, and 1033 may rotate at a constant speed in every direction. In other words, an electronic device generating the CAPTCHA interface 1000 may, at respective positions of the first arrow objects 1010, 1011, 1012, and 1013, generate the second arrow objects 1030, 1031, 1032, and 1033 that are dummy arrow objects rotating at a speed different from the speed of the first arrow objects 1010, 1011, 1012, and 1013 at the same positions as the first arrow objects 1010, 1011, 1012, and 1013.

In an embodiment, the second arrow objects 1030, 1031, 1032, and 1033 may rotate at a speed greater than that of the first arrow objects 1010, 1011, 1012, and 1013. When the second arrow objects 1030, 1031, 1032, and 1033 rotates at a very high speed, a human rather ignores movements of the second arrow objects 1030, 1031, 1032, and 1033. However, as a machine equally analyzes the first arrow objects 1010, 1011, 1012, and 1013 and the second arrow objects 1030, 1031, 1032, and 1033 in all frames, the second arrow objects 1030, 1031, 1032, and 1033 may be obstacles for the machine to estimate a correct answer for CAPTCHA. Accordingly, CAPTCHA according to embodiments described above may not be easily avoided by automation programs, and automation programs may be more efficiently and accurately distinguished from humans by classification by using CAPTCHA according to embodiments described above.

In an embodiment, for easy distinction of the user between the first arrow objects 1010, 1011, 1012, and 1013 and the second arrow objects 1030, 1031, 1032, and 1033, at least one of tone, saturation, or transparency of the second arrow objects 1030, 1031, 1032, and 1033 may be set different from tone, saturation, or transparency of the first arrow objects 1010, 1011, 1012, and 1013.

According to various embodiments of the disclosure, the question interface 1020 may include an interface including an arrangement of a series of the first arrow objects 1010, 1011, 1012, and 1013 and the second arrow objects 1030, 1031, 1032, and 1033 corresponding to the correct answer pattern. In an embodiment, the question interface 1020 may request the user to input correct answers for CAPTCHA. In an embodiment, the question interface 1020 may overlay on a background screen.

In an embodiment, configurations and types of the CAPTCHA interface 1000 may be differently set according to difficulty levels. The configurations and types of the CAPTCHA interface 1000 may be set in a way that it becomes difficult to recognize a correct answer for the CAPTCHA as a difficulty level increases. In other words, the configurations and types of the CAPTCHA interface 1000 may be set in a way that it becomes difficult to recognize the arrow object itself or difficult to recognize the arrow object taking a distinguished movement in the correct answer direction as the difficult level increases.

For example, the CAPTCHA interface 1000 at a low difficulty level may only include the first arrow objects 1010, 1011, 1012, and 1013, and the CAPTCHA interface 1000 at a high difficulty level may include all of the first arrow objects 1010, 1011, 1012, and 1013 and the second arrow objects 1030, 1031, 1032, and 1033. For example, saturation of the first arrow objects 1010, 1011, 1012, and 1013 or the second arrow objects 1030, 1031, 1032, and 1033 may be set high in the CAPTCHA interface 1000 at the low difficulty level, and the saturation of the first arrow objects 1010, 1011, 1012, and 1013 or the second arrow objects 1030, 1031, 1032, and 1033 may be set low in the CAPTCHA interface 1000 at the high difficulty level. For example, transparency of the first arrow objects 1010, 1011, 1012, and 1013 or the second arrow objects 1030, 1031, 1032, and 1033 may be set low in the CAPTCHA interface 1000 at the low difficulty level, and the transparency of the first arrow objects 1010, 1011, 1012, and 1013 or the second arrow objects 1030, 1031, 1032, or 1033 may be set high in the CAPTCHA interface 1000 at the high difficulty level. For example, transparency of the question interface 1020 may be set low in the CAPTCHA interface 1000 at the low difficulty level, and the transparency of the question interface 1020 may be set high in the CAPTCHA interface 1000 at the high difficulty level.

For example, the configurations and types of the CAPTCHA interface 1000 according to difficulty levels may be set combinations of one or more examples described above. Table 1 below shows an example of setting a configuration and a type of the CAPTCHA interface 1000 according to each difficulty level. However, the setting of configurations and types of the CAPTCHA interface are not limited to the following example.

TABLE 1

| Difficulty level | Add a second arrow object | Saturation of arrow objects | Transparency of arrow objects | Transparency of question interface |
|---|---|---|---|---|
| Level 1 | NO | NO | NO | NO |
| Level 2 | NO | NO | YES | YES |
| Level 3 | YES | NO | NO | NO |
| Level 4 | YES | YES | NO | NO |
| Level 5 | YES | YES | YES | YES |

In an embodiment, the difficulty levels may be adjusted according to skills of the user. For example, when the user inputs a correct answer for the CAPTCHA interface 1000 at a certain difficulty level, the CAPTCHA interface 1000 at a higher difficulty level may be used when requesting the same user later for user authentication. As another example, when the user has failed to input the correct answer for the CAPTCHA interface 1000 at the certain difficulty level, the CAPTCHA interface 1000 at a lower difficulty level may be used when requesting the same user later for user authentication.

In an embodiment, the difficultly level may be adjusted according to reliability of the user or a degree that the user is doubted as a machine. For example, the CAPTCHA interface 1000 at a low difficulty level may be used for periodical user authentication, and the CAPTCHA interface 1000 at a higher difficulty level may be used when detecting abnormal behaviors of the user and requesting for user authentication. For example, when abnormal behaviors of the user are detected several times for the same users, as the number of times of request for user authentication increases, the CAPTCHA interface 1000 at higher difficulty levels may be used. For example, when a detecting process for detecting abnormal behaviors of the user estimates the reliability of the user or a probability that the user is a machine, the difficulty level of the CAPTCHA interface 1000 may be determined according to a result of the estimation.

Figure 11:
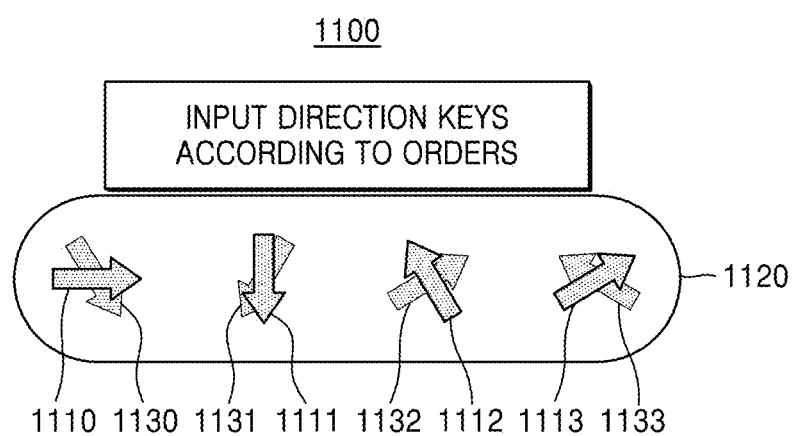
FIG. 11 is a diagram for describing a CAPTCHA interface, according to various embodiments of the disclosure.

FIG. 11 is a diagram for describing a CAPTCHA interface, according to various embodiments of the disclosure.

According to various embodiments of the disclosure, a CAPTCHA interface 1100 may include a question interface 1120 including first arrow objects 1110, 1111, 1112, and 1113 and second arrow objects 1130, 1131, 1132, and 1133. As the first arrow objects 1110, 1111, 1112, and 1113, the second arrow objects 1130, 1131, 1132, and 1133, and the question interface 1120 may correspond to the first arrow objects 1010, 1011, 1012, and 1013, the second arrow objects 1030, 1031, 1032, and 1033, and the question interface 1020 shown in FIG. 10, repeated descriptions are omitted.

In an embodiment, tone, saturation, or transparency of the second arrow objects 1130, 1131, 1132, and 1133 may be set identical to that of the first arrow objects 1110, 1111, 1112, and 1113. In this case, unlike in the embodiment shown in FIG. 10, the computer may not distinguish the first arrow objects 1110, 1111, 1112, and 1113 and the second arrow objects 1130, 1131, 1132, and 1133 from a captured frame. Therefore, even when an automated process captures the correct answer frame and a previous/next frame thereof and compares the correct answer frame to the previous/next frame thereof to estimate the correct answer for CAPTCHA, it is difficult to distinguish that the arrow objects are taking different movements in the correct answer direction. Accordingly, it is possible to prevent attempts by automation programs to find a correct answer direction by capturing continuous frames.

Figure 12:
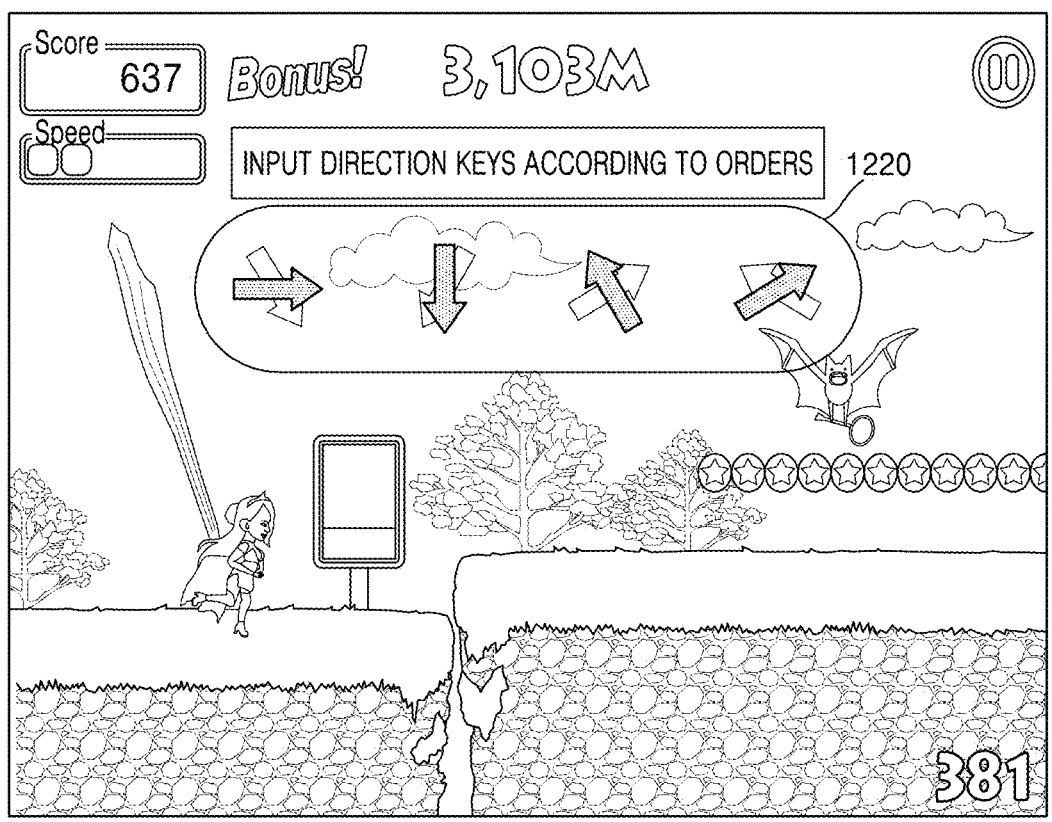
FIG. 12 is a diagram of an embodiment of using a CAPTCHA interface of the disclosure.

FIG. 12 is a diagram of an embodiment in which a CAPTCHA interface of the disclosure is used.

FIG. 12 shows an embodiment of an application screen on which a CAPTCHA interface 1220 is displayed in a user terminal. As shown in FIG. 12, the CAPTCHA interface 1220 may be overlaid and displayed on the application screen. In an embodiment, the CAPTCHA interface 1220 may be displayed when the user authentication is requested while the user is using the service. Although FIG. 12 illustrates an example in which the CAPTCHA interface 1220 is used in a game application, it will be understood that the CAPTCHA interface 1220 may also be displayed for user authentication in applications for other arbitrary online activities other than game applications.

In an embodiment, the CAPTCHA interface 1220 may display an animation of rotating arrow objects corresponding to a correct answer pattern, and may request the user for input of a correct answer pattern. In an embodiment, when the correct answer direction is determined as one direction from among up, down, left, and right, the electronic device may receive direction inputs of the user through direction keys of a keyboard.

In an embodiment, when the CAPTCHA interface 1220 is displayed, the electronic device may set the application not to respond to the direction inputs by the user. For example, when the direction input by the user in the application is an operation to move a game character, while the CAPTCHA interface 1220 is being displayed, the game character may be not moved despite the direction input by the user. In an embodiment, when the CAPTCHA interface 1220 is displayed, operation of the application may pause in the period of displaying the CAPTCHA interface 1220.

In an embodiment, when the direction input by the user is identical to the correct answer pattern, the CAPTCHA interface 1220 may disappear from the screen, and use of the service by the user may resume. In an embodiment, when the direction input by the user is not identical to the correct answer pattern, use of the service by the user may be stopped, or a certain penalty regarding use of the service may be given to the user. In an embodiment, when the direction input by the user is not identical to the correct answer pattern, the CAPTCHA interface 1220 corresponding to a new correct answer pattern may be displayed and request the user again for the direction input.

Figure 13:
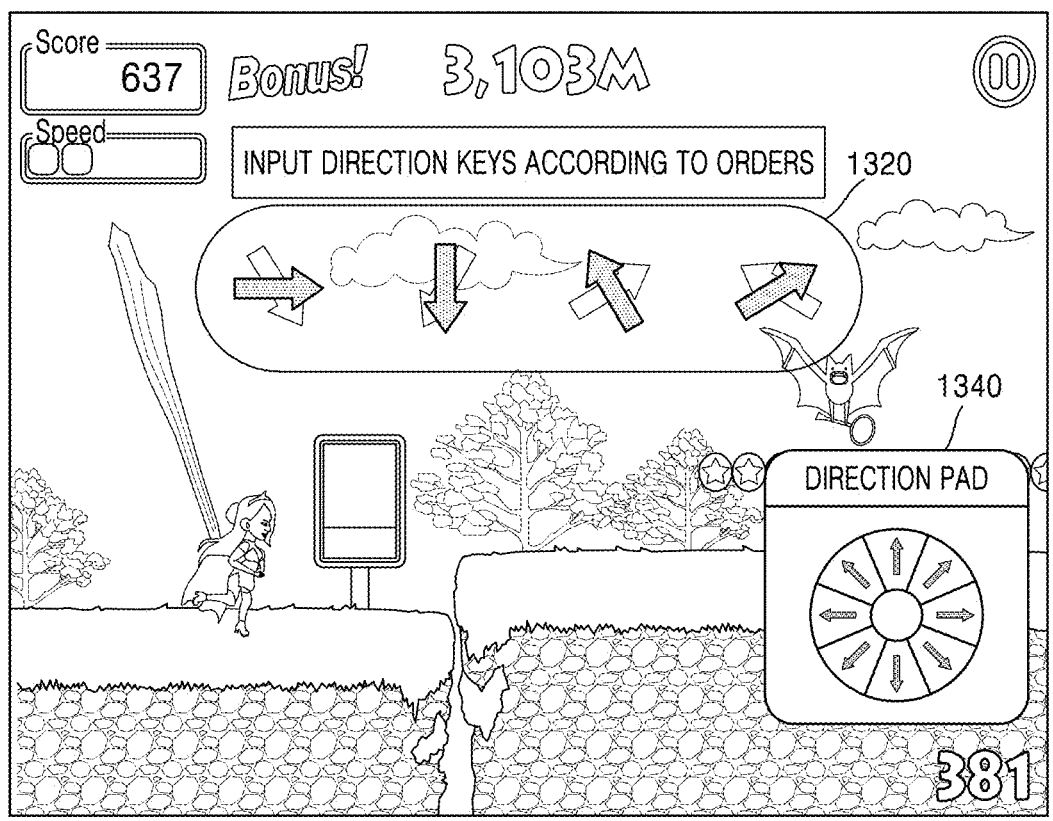
FIG. 13 is a diagram of another embodiment of using a CAPTCHA interface of the disclosure.

FIG. 13 is a diagram of another embodiment in which a CAPTCHA interface of the disclosure is used.

FIG. 13 illustrates an example of an application screen on which a CAPTCHA interface 1320 and a direction input interface 1340 are displayed in the user terminal. In an embodiment, the CAPTCHA interface 1320 may display an animation of rotating arrow objects corresponding to the correct answer pattern, and may request the user for input of the correct answer pattern. As the CAPTCHA interface 1320 may correspond to the CAPTCHA interface 1220 shown in FIG. 12, repeated description are omitted.

In an embodiment, when the CAPTCHA interface 1320 is displayed, the direction input interface 1340 for the user to input the correct answer for CAPTCHA may be displayed together. As shown in FIG. 13, the CAPTCHA interface 1340 may be overlaid and displayed on the application screen. In another embodiment, the direction input interface 1340 may be an interface used for direction input in the application, regardless of the CAPTCHA interface 1320. In this case, when the CAPTCHA interface 1320 is displayed, input of the direction input interface 1340 may be configured not to be used for operating the existing applications but to be only used for input of correct answer for CAPTCHA.

In various embodiments, the direction input interface 1340 may be an interface for inputting directions by receiving click or touch inputs by the user. In an embodiment, the direction input interface 1340 may include direction buttons corresponding to certain correct answer directions. Although eight direction buttons corresponding to eight correct answer directions are shown as an example in FIG. 13, the number of direction buttons is not limited thereto. In another embodiment, the direction input interface 1340 may include a direction pad capable of inputting arbitrary directions. When a click or touch input by the user through the direction pad is obtained, the electronic device may determine a direction from a reference point to a click or touch point as a direction input by the user.

In an embodiment, when the direction input by the user is identical to the correct answer pattern, the CAPTCHA interface 1320 and the direction input interface 1340 may disappear from the screen, and use of the service by the user may resume.

Figure 14:
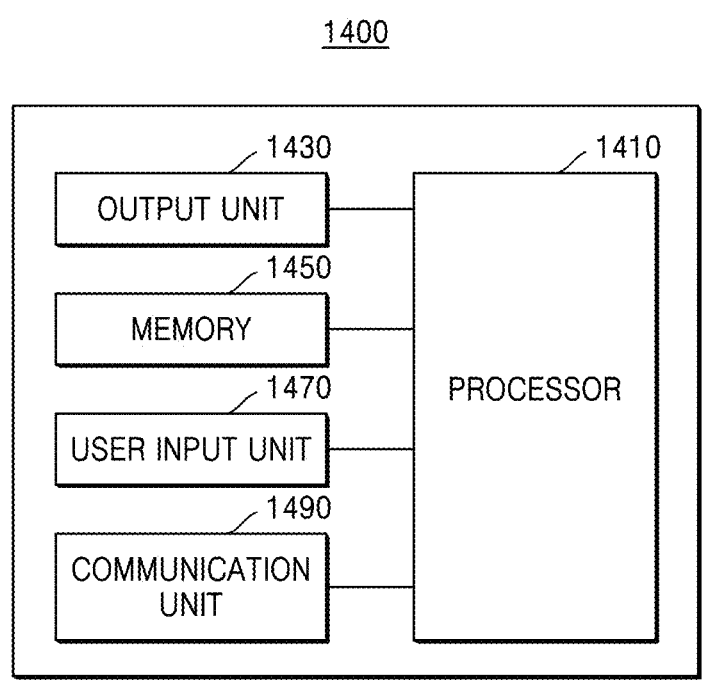
FIG. 14 is a diagram for describing a detailed configuration of an electronic device according to various embodiments of the disclosure.

FIG. 14 is a diagram for describing a detailed configuration of an electronic device according to various embodiments of the disclosure.

As shown in FIG. 14, an electronic device 1400 according to some embodiments may include at least one processor 1410, an output unit 1430, a memory 1450, a user input unit 1470, and a communication unit 1490. However, elements shown in FIG. 14 are not indispensable elements of the electronic device 1400. The electronic device 1400 may be implemented by elements more than the elements shown in FIG. 14, and may also be implemented by elements less than the elements shown in FIG. 14. The electronic device 1400 may include a user terminal, a server, a network system, or a separate device.

According to an embodiment of the disclosure, the processor 1410 generally controls all operations of the electronic device 1400. For example, the processor 1410 may generally control the output unit 1430, the memory 1450, the user input unit 1470, the communication unit 1490, and the like by executing a program stored in the memory 1450. The processor 1410 may control operations of the electronic device 1400 in the specification by controlling the output unit 1430, the memory 1450, the user input unit 1470, the communication unit 1490, and the like.

According to an embodiment, the processor 1410 be configured to determine a correct answer having at least one correct answer direction, generate, with respect to each of the at least one correct answer direction, an animation of an arrow object rotating with a movement distinguished from movements in other directions with reference to the correct answer direction, display, through a display of the output unit 1430, a CAPTCHA interface corresponding to the correct answer pattern and including an arrangement of the generated animation, receive a direction input from the user input unit 1740, and determine whether the user has been authenticated according to a result of comparing the received direction input with the correct answer pattern.

According to an embodiment, the processor 1410 may be configured to generate frames that construct an animation in which the arrow object rotates at a constant speed, and generate an animation in which the arrow object flickers when pointing in the correct answer by removing the arrow object from a frame at a time point at which the arrow object points in the correct answer direction.

According to an embodiment of the disclosure, the processor 1410 may be configured to generate frames that construct an animation in which the arrow object rotates at a constant speed, and generate an animation in which the arrow object temporarily pauses when pointing in the correct answer direction, by additionally inserting a frame at which the arrow object points in the correct answer direction.

According to an embodiment, the processor 1410 may be configured to generate frames that construct an animation in which the arrow object rotates at a constant speed, and generate an animation in which the arrow object rotates at a speed less than the constant speed when pointing in the correct answer direction, by additionally inserting a frame before or after a time point when pointing in the correct answer direction.

According to an embodiment of the disclosure, the processor 1410 may be configured to generate frames that construct an animation in which the arrow object rotates at a constant speed, and generate an animation in which the arrow object shakes when pointing to the correct answer directions, by changing orders of previous and next frames at a time point at which the arrow object points in the correct answer direction in the animation.

According to an embodiment, the processor 1410 may be configured to generate an animation including a first arrow object, which rotates with a movement distinguished from movements in other directions in the correct answer direction, and a second arrow object which rotates at a speed different from a speed of the first arrow object and overlaps with the first arrow object.

The output unit 1430 may display and output information processed by the electronic device 1400. The output unit 1430 may, under control of the processor 1410, output an application screen including graphic interfaces according to various embodiments of the disclosure, under control of the processor. According to an embodiment, the output unit 1430 may display a CAPTCHA interface including an arrangement of animations of arrow objects corresponding to correct answer patterns. According to an embodiment of the disclosure, the output unit 1430 may display a direction input interface for receiving a direction input by the user.

The memory 1450 may store a program for processing and controlling of the processor 1410, and may also store data input to/output from the electronic device 1400.

According to an embodiment of the disclosure, the processor 1410 may execute a method of authenticating a user by using CAPTCHA by using the program stored in the memory 1450.

According to an embodiment of the disclosure, the memory 1450 may include at least one type of storage medium from among a flash memory type, a hard disk type, a multimedia card micro type, a card type memory (for example, an SD memory or an XD memory), random access memory (RAM), static random access memory (SRAM), read-only memory (ROM), Electrically Erasable Programmable Read-Only Memory (EEPROM), Programmable Read-Only Memory (PROM), a magnetic memory, a magnetic disk, and an optical disk. In addition, according to an embodiment of the disclosure, the programs stored in the memory 1450 may be classified into a plurality of modules according to functions thereof.

The user input unit 1470 indicates a device by which the user inputs data to control the electronic device 1400. For example, the user input unit 1470 may include devices capable of receiving various types of user inputs, for example, a keyboard, a physical button, a mouse, a joystick, a touchscreen, a touchpad, a camera, a microphone, or the like. According to an embodiment of the disclosure, the user input unit 1470 may obtain a direction input by the user to input a correct answer for CAPTCHA. According to an embodiment of the disclosure, the user input unit 1470 may receive a direction input by the user through direction keys of the keyboard. According to an embodiment of the disclosure, a user input of clicking or touching points indicating directions may be received through the direction input interface.

The communication unit 1490 may perform communication with an external device under control of the processor 1410. For example, the communication unit 1490 may perform communication with an external device such as a payment server or an authentication server under control of the processor 1410. In addition, the communication unit 1490 may obtain user information or the user input through communication with an external interface.

According to an embodiment of the disclosure, the method of authenticating the user by using CAPTCHA may be performed in the electronic device 1400, the server, or the user terminal, in addition, at least one element included in the electronic device 1400 may perform the embodiments described above with reference to FIGS. 1 to 13.

In addition, the server and the user terminal may separately or together perform the method of authenticating the user by using CAPTCHA. Configurations of the server and the user terminal will be described in further details with reference to FIGS. 15 and 16 below.

Figure 15:
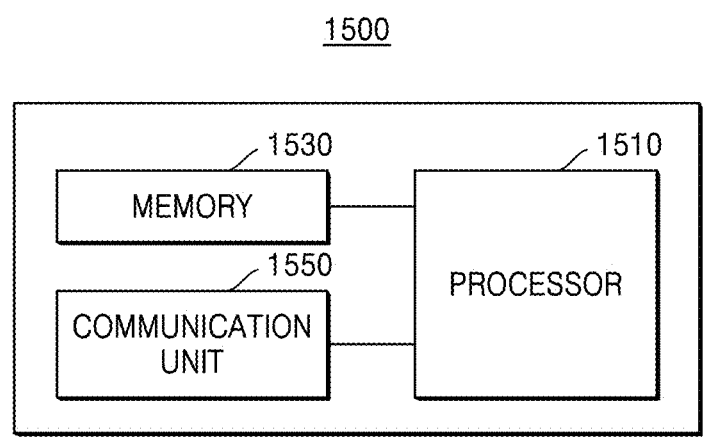
FIG. 15 is a diagram for describing a detailed configuration of a server according to various embodiments of the disclosure.

FIG. 15 is a diagram for describing a detailed configuration of a server according to various embodiments of the disclosure.

As shown in FIG. 15, a server 1500 according to some embodiments may include at least one processor 1510, a communication unit 1530, and a memory 1550. However, not all elements shown in FIG. 15 are indispensable elements of the server 1500. The server 1500 may be implemented by more elements than the elements shown in FIG. 15, or may be implemented by less elements than the elements shown in FIG. 15.

According to an embodiment of the disclosure, the processor 1510 generally controls all operations of the server 1500. For example, the processor 1510 may control all of the communication unit 1530 and the memory 1550 by executing programs stored in the memory 1550. The processor 1510 may control operations of the server 1500 in the specification by controlling the communication unit 1530, the memory 1550, and the like.

According to an embodiment of the disclosure, the processor 1510 may determine whether user authentication is required for a user terminal 1600 which attempts to use service or already uses service, and when it is determined that the user authentication is required, the processor 1510 may transmit a user authentication request to the user terminal 1600 through the communication unit 1530. According to an embodiment of the disclosure, the processor 1510 may receive a result of user authentication of the user terminal 1600 through the communication unit 1530. According to an embodiment of the disclosure, according to the received result of user authentication, the processor 1510 may permit the user to use the service, block the user from accessing the service, or request the user for re-authentication.

According to an embodiment of the disclosure, the processor 1510 may determine whether user authentication is required for the user terminal which attempts to use the service or already uses the service, and when it is determined that the user authentication is required, the processor 1510 may determine a correct answer pattern having at least one correct answer direction. The processor 1510 may transmit the determined correct answer pattern to the user terminal 1600 through the communication unit 1530. According to an embodiment of the disclosure, the processor 1510 may receive a direction input by the user from the user terminal 1600 through the communication unit 1530, and may determine whether the user has been authenticated by comparing the received direction input by the user to the correct answer pattern. According to the result of user authentication, the processor 1510 may permit the user to use the service, block the user from using the service, or request the user for re-authentication.

According to an embodiment of the disclosure, operations of the processor 1510 may correspond to the operations of the processor 1410 of the electronic device 1400 described with reference to FIG. 14, and thus, detailed descriptions are omitted.

Under control of the processor 1510, the communication unit 1530 may provide inquiries to the user terminal 1600 and receive response information regarding the inquiries. In addition, according to an embodiment of the disclosure, the communication unit 1530 may transmit/receive data to/from the user terminal 1600, and the data transmitted to/received from the user terminal 1600 may include control data for controlling the user terminal 1600 or the programs included in the user terminal 1600.

According to an embodiment of the disclosure, the communication unit 1530 may transmit a user authentication request to the user terminal 1600 under control of the processor 1510. According to an embodiment of the disclosure, the communication unit 1530 may receive a result of user authentication of the user terminal 1600 under control of the processor 1510.

According to an embodiment of the disclosure, the communication unit 1530 may transmit a correct answer pattern for CAPTCHA to the user terminal 1600 under control of the processor 1510. According to an embodiment of the disclosure, the communication unit 1530 may, under control of the processor 1510, receive a direction input by the user from the user terminal 1600.

The memory 1550 may store programs for processing and controlling of the processor 1510, and may also store data input to/output from the server 1500.

According to an embodiment of the disclosure, the processor 1510 may execute a method of authenticating a user by using CAPTCHA by using programs stored in the memory 1550.

According to an embodiment of the disclosure, the memory 1550 may include at least one type of storage medium from among a flash memory type, a hard disk type, a multimedia card micro type, a card type memory (for example, Secure Digital (SD) memory or eXtreme Digital (XD) memory), random access memory (RAM), static random access memory (SRAM), read-only memory (ROM), Electrically Erasable Programmable Read-Only Memory (EEPROM), Programmable Read-Only Memory (PROM), a magnetic memory, a magnetic disk, and an optical disk. In addition, according to an embodiment of the disclosure, the programs stored in the memory 1550 may be classified into a plurality of modules according to functions thereof.

In addition, according to an embodiment, the method of authenticating the user by using CAPTCHA may be separately performed by the server 1500 and the user terminal, individually performed by each of the server 1500 and the user terminal 1600, and may also be performed by the electronic device 1400.

Figure 16:
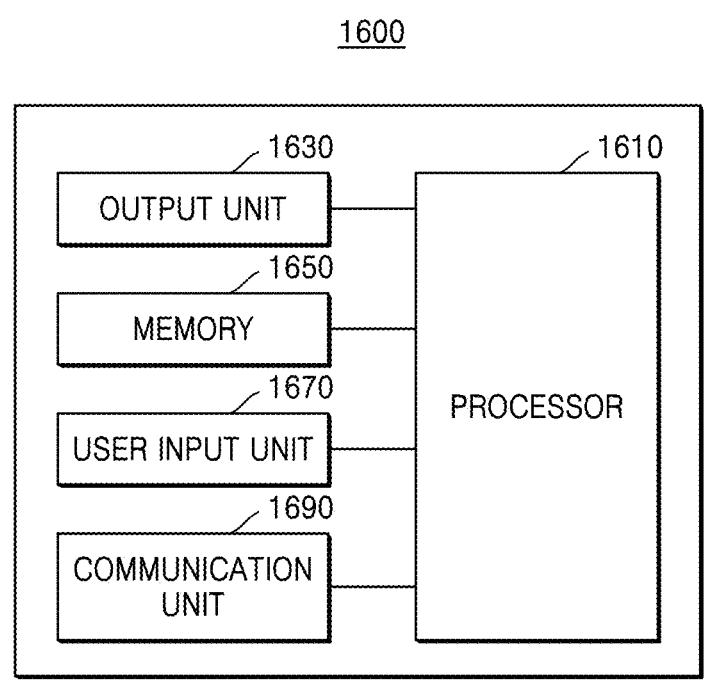
FIG. 16 is a diagram for describing a detailed configuration of a user terminal according to various embodiments of the disclosure.

FIG. 16 is a diagram for describing a detailed configuration of a user terminal according to various embodiments of the disclosure.

As shown in FIG. 16, a user terminal 1600 according to some embodiments may include at least one processor 1610, an output unit 1630, a memory 1650, a user input unit 1670, and a communication unit 1690. However, not all elements shown in FIG. 16 are indispensable elements of the electronic device 1600. The user terminal 1600 may be implemented by more elements than the elements shown in FIG. 16, or may be implemented by less elements than the elements shown in FIG. 16.

According to an embodiment, the processor 1610 generally controls overall operations of the user terminal 1600. For example, the processor 1610 may control all of the output unit 1630, the memory 1650, the user input unit 167, the communication unit 1690, and the like by executing programs stored in the memory 1650. The processor 1610 may control operations of the user terminal 1600 in the specification by controlling the output unit 1630, the memory 1650, the user input unit 1670, the communication unit 1690, and the like.

According to an embodiment, the processor 1610 may receive a user authentication request from the server 1500 through the communication unit 1690. According to an embodiment of the disclosure, the processor 1610 may, based on receipt of the user authentication request, determine a correct answer pattern having at least one correct answer pattern, generate, with respect to the at least one correct answer direction, an animation of an arrow object rotating with a movement distinguished from movements other directions with reference to the correct answer direction, display a CAPTCHA interface corresponding to the correcting answer and including an arrangement of the generated animations, receive a direction input from the user, and determine whether the user has been authenticated according to a result of the received direction input with the correct answer pattern. According to an embodiment, the processor 1610 may transmit the result of user authentication to the server 1500 through the communication unit 1690.

According to an embodiment, the processor 1610 may receive the correct answer pattern from the server 1500 through the communication unit 1690. According to an embodiment, the processor 1610 may, with respect to each of at least one correct answer pattern constructing a correct answer pattern, generate an animation of an arrow object rotating with a movement distinguished from movements in other directions with reference to the correct answer direction, display a CAPTCHA interface corresponding to the correct answer pattern and including an arrangement of the generated animation, and receive a direction input from the user. According to an embodiment of the disclosure, the processor 1610 may transmit the direction input by the user to the server 1500 through the communication unit 1690.

According to an embodiment of the inventive concept, operations of the processor 1610 may correspond to the operations of the processor 1410 of the electronic device 1400 described with reference to FIG. 14, and thus, detailed descriptions are omitted.

The output unit 1630 may display and output information processed by the user terminal 1600. The output unit 1630 may include at least one of a liquid crystal display, a thin film transistor-liquid crystal display, an organic light-emitting diode, a flexible display, a three-dimensional (3D) display, and an electrophoretic display. When the output unit 1630 and a touchpad form a layered structure and construct a touchscreen, the output unit 1630 may be used as an input device as well as an output device. In addition, the output unit 1630 may include a light-emitting diode (LED) lamp, a vibration motor, a speaker, a flash, and the like, and is not limited to the examples.

The output unit 1630 may, under control of the processor 1610, output an application screen including graphic interfaces according to various embodiments of the disclosure. According to an embodiment, the output unit 1630 may display a CAPTCHA interface including an arrangement of animations of arrow objects corresponding to the correct answer patterns. According to an embodiment of the disclosure, the output unit 1630 may display a direction input interface for receiving a direction input by the user.

The memory 1650 may store programs for processing and controlling of the processor 1610, and may also store data input to/output from the user terminal 1600.

According to an embodiment, the processor 1610 may, by using the programs stored in the memory 1650, perform method of authenticating a user by using CAPTCHA.

According to an embodiment of the disclosure, the memory 1650 may include at least one type of storage medium from among a flash memory type, a hard disk type, a multimedia card micro type, a card type memory (for example, SD memory or XD memory), RAM, SRAM, ROM, EEPROM, PROM, a magnetic memory, a magnetic disk, and an optical disk. In addition, according to an embodiment of the disclosure, the programs stored in the memory 1650 may be classified into a plurality of modules according to functions thereof.

According to an embodiment, the user input unit 1670 may include various interfaces. For example, the user input unit 1670 may include various interfaces such as a key pad, a dome switch, a voice input interface, a fingerprint input interface, a touch input interface (a touch type electrostatic capacitance method, a resistive overlay method, an infrared ray sensing method, a surface acoustic wave method, an integral strain gauge method, a piezoelectric effect method, and the like), a camera, a jog wheel, a jog switch, and the like, and may have various sensors such as an acceleration censor, a position sensor, a temperature sensor, an optic sensor, and the like connected to the user interface. However, the user input unit 1670 is not limited thereto and may include devices supporting various inputs.

According to an embodiment of the disclosure, the user input unit 1470 may obtain a direction input by the user to input a correct answer for CAPTCHA. According to an embodiment of the disclosure, the user input unit 1470 may receive a direction input by the user through direction keys of the keyboard. According to an embodiment of the disclosure, a user input clicking or touching points indicating directions may be received through the direction input interface.

The communication unit 1690 may, under control of the processor 1610, provide inquiries to the server 1500 and receive response information regarding the inquiries. In addition, according to an embodiment of the disclosure, the communication unit 1690 may transmit/receive data to/from the server 1500, and the data transmitted to/received from the server may include control data for controlling the user terminal 1600 or the programs stored in the user terminal 1600.

According to an embodiment of the disclosure, the communication unit 1690 may, under control of the processor 1610, receive a user authentication request from the server 1500. According to an embodiment of the disclosure, the communication unit 1690 may, under control of the processor 1610, transmit a result of user authentication to the server 1500.

According to an embodiment of the disclosure, the communication unit 1690 may, under control of the processor 1610, receive a correct answer pattern of CAPTCHA from the server 1500. According to an embodiment of the disclosure, the communication unit 1690 may, under control of the processor 1610, transmit a direction input by the user to the server 1500.

According to an embodiment, the communication unit 1690 may include a Bluetooth communication unit, a Bluetooth Low Energy (BLE) communication unit, a Near Field Communication unit, Wireless Local Area Network (WLAN) communication unit, a Zigbee communication unit, an infrared Data Association communication unit, Wireless Fidelity (Wi-Fi) Direct (WFD) communication unit, an ultra wideband (UWB) communication unit, an Ant+ communication unit, and the like, but is not limited thereto.

In addition, according to an embodiment of the disclosure, the communication unit 1690 transmits/receives a wireless signal to/from at least one of a base station, an external terminal, and a server on a mobile network. Here, the wireless signal may include an audio call signal, a video call signal, or various kinds of data according to transmitting/receiving of text/multimedia messages.

The device described above may be embodied by hardware elements, software elements, and/or combinations of the hardware elements and the software elements. For example, devices and elements described with reference to the embodiments may be implemented, for example, by using at least one general-purpose computer or a dedicated computer, such as a processor, a controller, an arithmetic logic unit (ALU), a digital signal processor, a microcomputer, a field programmable gate array (FPGA), a programmable logic unit (PLU), a microprocessor, or any other devices of capable of executing instructions and respond thereto. A processing device may execute an operating system (OS) and at least one software application system executed on the OS. In addition, the processing device may access, store, manipulate, process, and generate data in response to execution of the software. Although a case of using one processing device may be described for convenience of explanation, it will be understood by those of skilled in the art that the processing device include a plurality of processing elements and/or plural types of processing elements. For example, the processing device may include a plurality of processors, or may include a processor and a controller. In addition, other processing configurations such as a parallel processor are also available.

Software may include a computer program, a code, an instruction, or a combination of one or more thereof, and may configure the processing device to operate as desired, or may independently or collectively command the processing device. Software and/or data may be permanently or temporarily embodied in certain types of machines, components, physical devices, virtual equipment, computer storage medium or devices, or signal waves on transmission, to thereby being interpreted by the processing device or providing commands or data to the processing device. Software may be dispersed on a network-connected computer system, and may be stored or executed in a dispersed method. Software and data may be stored in at least one computer-readable recording medium.

Methods according to embodiments may be embodied in a computer command type, which may be performed by using various computer tools, and may be recorded in a computer-readable medium. The computer-readable medium may include a program command, a data file, a data structure, and the like, alone or in combination. The program commands recorded in the medium may be specifically designed and configured for embodiments or may be known and available to those skilled in the field of computer software. Examples of the computer-readable recording medium include magnetic media such as a hard disk, a floppy disk, and a magnetic tape, optical media such as compact disc-read only memory (CD-ROM) and digital versatile disc (DVD), magneto-optical media such as a floptical disk, and a hardware device such as ROM, RAM, and flash memory which are specifically configured to store and execute the program commands. Examples of the program commands may include a high-level language code which may be executed by a computer by using interpreter and the like, as well as a machine language code generated by compiler. The hardware device may be configured to operate as one or more software modules to perform operations in the embodiments, and vice versa.

Although the embodiments have been shown and described by limited embodiments and the drawings, those of skilled in the art may perform various modification based on the descriptions. For example, appropriate results may be achieved even when the described techniques are performed in an order different from the method described above, and/or elements such as the system, structure, device, circuit are bonded or combined in a form different from the method described above, or replaced or substituted by another element or equivalents thereof.

According to various embodiments of the disclosure, a method and an apparatus for authenticating a user by using CAPTCHA may be provided.

According to various embodiments of the disclosure, a more effective method of identifying an automation program by distinction from human may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A user authentication method using Completely Automated Public Turing test to tell Computers and Humans Apart (CAPTCHA), the user authentication method comprising:
    determining a correct answer pattern having at least one correct answer direction;
    generating, with respect to each of the at least one correct answer direction, an animation of an arrow object rotating with a movement distinguished from movements in other directions with reference to the correct answer direction;
    displaying a CAPTCHA interface corresponding to the correct answer pattern and comprising an arrangement of the generated animation;
    receiving a direction input from a user; and
    determining whether the user has been authenticated, according to a result of comparing the direction input with the correct answer pattern.

2. The user authentication method of claim 1, wherein each of the at least one correct answer direction is determined as one of up, down, left, and right directions.

3. The user authentication method of claim 1, wherein each of the at least one correct answer direction is determined as an arbitrary direction.

4. The user authentication method of claim 1, wherein
    the correct answer pattern has a preset number of correct answer directions, and
    the CAPTCHA interface comprises the preset number of animations of arrow objects.

5. The user authentication method of claim 1, wherein the generating of the animation comprises:
    generating frames that construct an animation in which the arrow object rotates at a constant speed; and
    generating an animation in which the arrow object flickers when pointing in the correct answer, by removing the arrow object from a frame at a time point at which the arrow object points in the correct answer direction.

6. The user authentication method of claim 1, wherein the generating of the animation comprises:
    generating frames that construct an animation in which the arrow object rotates at a constant speed; and
    generating an animation in which the arrow object temporarily pauses when the arrow object points in the correct answer direction, by additionally inserting a frame at a time point at which the arrow object points in the correct answer direction.

7. The user authentication method of claim 1, wherein the generating of the animation comprises:
    generating frames that construct an animation in which the arrow object rotates at a constant speed; and
    generating an animation in which the arrow object rotates at a speed less than the constant speed when pointing in the correct answer direction, by additionally inserting a frame before or after a time point at which the arrow object points in the correct answer direction.

8. The user authentication method of claim 1, wherein the generating of the animation comprises:
    generating frames that construct an animation in which the arrow object rotates at a constant speed; and
    generating an animation in which the arrow object shakes when pointing in the correct answer direction, by changing orders of previous and next frames at a time point at which the arrow object points in the correct answer direction in the animation.

9. The user authentication method of claim 1, wherein the receiving of the direction input comprises receiving a direction input of a user through direction keys of a keyboard.

10. The user authentication method of claim 1, wherein
    the CAPTCHA interface comprises a direction input interface configured to receive a direction input, and
    receiving the direction input comprises receiving a user input of clicking or touching a point that points in a direction through the direction input interface.

11. The user authentication method of claim 1, wherein the generating of the animation comprises:
    generating an animation comprising a first arrow object, which rotates with a movement distinguished from movements in other directions in the correct answer direction, and a second arrow object that rotates at a speed different from a speed of the first arrow object and overlaps with the first arrow object.

12. The user authentication method of claim 11, wherein at least one of tone, saturation, or transparency of the second arrow object is respectively different from tone, saturation, or transparency of the first arrow object.

13. The user authentication method of claim 11, wherein tone, saturation, or transparency of the second arrow object are respectively identical to tone, saturation, or transparency of the first arrow object.

14. An electronic device configured to authenticate a user by using Completely Automated Public Turing test to tell Computers and Humans Apart (CAPTCHA), the electronic device comprising:
   a display:
   a user input unit;
   a memory configured to store instructions; and
   at least one processor functionally connected to the display, the user input unit, and the memory and configured to execute the instructions,
   wherein the at least one processor is configured to execute the instructions,
   determine a correct answer pattern having at least one correct answer direction,
   generate, with respect to each of the at least one correct answer direction, an animation of an arrow object which rotates with a movement distinguished from movements in other directions with reference to the correct answer pattern,
   display, through the display, a CAPTCHA interface corresponding to the correct answer pattern and comprising an arrangement of the generated animation,
   receive a direction input from the user input unit, and
   determine whether the user has been authenticated, according to a result of comparing the received direction input with the correct answer pattern.

15. The electronic device of claim 14, wherein the at least one processor is further configured to
   generate frames that construct an animation in which the arrow object rotates at a constant speed, and
   generate an animation in which the arrow object flickers when pointing in the correct answer direction, by deleting the arrow object from a frame at a time point at which the arrow object points in the correct answer direction.

16. The electronic device of claim 14, wherein the at least one processor is further configured to
   generate frames that construct an animation in which the arrow object rotates at a constant speed, and
   generate an animation in which the arrow object temporarily pauses when pointing in the correct answer direction, by additionally inserting a frame at a time point at which the arrow object points in the correct answer direction.

17. The electronic device of claim 14, wherein the at least one processor is further configured to
   generate frames that construct an animation in which the arrow object rotates at a constant speed, and
   generate an animation in which the arrow object rotates at a speed less than the constant speed when pointing in the correct answer direction, by additionally inserting a frame before or after a time point at which the arrow object points in the correct answer direction.

18. The electronic device of claim 14, wherein the at least one processor is further configured to
   generate frames that construct an animation in which the arrow object rotates at a constant speed, and
   generate an animation in which the arrow object shakes when pointing in the correct answer direction, by changing orders of previous and next frames at a time at which the arrow object points in the correct answer direction in the animation.

19. The electronic device of claim 14, wherein the at least one processor is further configured to generate an animation comprising a first arrow object, which rotates with a movement distinguished from movements in other directions in the correct answer direction, and a second arrow object which rotates at a speed different from a speed of the first arrow object and overlaps with the first arrow object.

20. A tangible computer-readable recording medium comprising:
   determining a correct answer pattern having at least one correct answer direction;
   generating, with respect to each of the at least one correct answer direction, an animation of an arrow object rotating with a movement distinguished from movements in other directions with reference to the correct answer direction;
   displaying a CAPTCHA interface corresponding to the correct answer pattern and comprising an arrangement of the generated animations;
   receiving a direction input from a user; and
   determining whether the user has been authenticated, according to a result of comparing the received direction input with the correct answer pattern.

* * * * *